US011882558B2

(12) United States Patent
Abotabl et al.

(10) Patent No.: US 11,882,558 B2
(45) Date of Patent: Jan. 23, 2024

(54) SOFT METHODS FOR RESOURCE SELECTION BASED ON SIDELINK CONTROL INFORMATION

(71) Applicant: QUALCOMM Incorporated, San Diego, CA (US)

(72) Inventors: Ahmed Attia Abotabl, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 17/347,145

(22) Filed: Jun. 14, 2021

(65) Prior Publication Data
US 2022/0400476 A1    Dec. 15, 2022

(51) Int. Cl.
*H04W 72/20* (2023.01)
*H04W 72/54* (2023.01)
*H04L 5/00* (2006.01)

(52) U.S. Cl.
CPC .......... *H04W 72/20* (2023.01); *H04L 5/0048* (2013.01); *H04W 72/54* (2023.01)

(58) Field of Classification Search
CPC . H04W 52/245; H04W 52/383; H03M 13/45; H04L 1/005
See application file for complete search history.

(56) References Cited

U.S. PATENT DOCUMENTS

| | | | | |
|---|---|---|---|---|
| 2017/0070377 | A1* | 3/2017 | Sawahashi | H04L 27/2602 |
| 2017/0188391 | A1* | 6/2017 | Rajagopal | H04W 28/0284 |
| 2018/0019766 | A1* | 1/2018 | Yang | H03M 13/13 |
| 2018/0048335 | A1* | 2/2018 | Sun | H04L 1/005 |
| 2021/0067269 | A1* | 3/2021 | Chen | H04L 1/0041 |
| 2021/0136699 | A1* | 5/2021 | Scholand | H04W 4/40 |
| 2021/0352665 | A1* | 11/2021 | Kang | H04L 5/0094 |

* cited by examiner

*Primary Examiner* — Yee F Lam
(74) *Attorney, Agent, or Firm* — Holland & Hart LLP

(57) ABSTRACT

Methods, systems, and devices for wireless communications at a user equipment (UE) are described. The UE may receive control signaling for indicating an availability of a sidelink resource. The UE may attempt to decode the control signaling. The UE may select, based on receiving the control signaling, a log likelihood ratio quality value associated with the control signaling and a reference signal received power value associated with the control signaling. The UE may select a resource availability probability value associated with the sidelink resource based on attempting to decode the control signaling, the log likelihood ratio quality, and the reference signal received power value. The UE may transmit a sidelink message based at least in part on the resource availability probability value.

28 Claims, 15 Drawing Sheets

SOFT METHODS FOR RESOURCE SELECTION BASED ON SIDELINK CONTROL INFORMATION

FIELD OF TECHNOLOGY

The following relates to wireless communications at a user equipment (UE), including soft methods for resource selection based on sidelink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support soft methods for resource selection based on sidelink control information. Generally, the described techniques provide for resource selection in sidelink communications. A user equipment (UE) may receive control signaling that may indicate an availability of a sidelink resource. The UE may attempt to decode the control signaling. The UE may select, based on receiving the control signaling, one or more values, such as a log likelihood ratio quality value that may be associated with the control signaling and a reference signal received power value that may be associated with the control signaling. The UE may select a resource availability probability value associated with the sidelink resource based on attempting to decode the control signaling, on the log likelihood ratio quality, and on the reference signal received power value. The UE may transmit a sidelink message based at least in part on the resource availability probability value.

A method for wireless communications at a user equipment (UE) is described. The method may include receiving control signaling for indicating an availability of a sidelink resource, attempting to decode the control signaling, selecting, based on receiving the control signaling, a log likelihood ratio quality value associated with the control signaling and a reference signal received power value associated with the control signaling, selecting a resource availability probability value associated with the sidelink resource based on attempting to decode the control signaling, the log likelihood ratio quality value, and the reference signal received power value, and transmitting a sidelink message based on the resource availability probability value.

An apparatus for wireless communications at a UE is described. The apparatus may include a processor, memory coupled with the processor, and instructions stored in the memory. The instructions may be executable by the processor to cause the apparatus to receive control signaling for indicating an availability of a sidelink resource, attempt to decode the control signaling, select, based on receiving the control signaling, a log likelihood ratio quality value associated with the control signaling and a reference signal received power value associated with the control signaling, select a resource availability probability value associated with the sidelink resource based on attempting to decode the control signaling, the log likelihood ratio quality value, and the reference signal received power value, and transmit a sidelink message based on the resource availability probability value.

Another apparatus for wireless communications at a UE is described. The apparatus may include means for receiving control signaling for indicating an availability of a sidelink resource, means for attempting to decode the control signaling, means for selecting, based on receiving the control signaling, a log likelihood ratio quality value associated with the control signaling and a reference signal received power value associated with the control signaling, means for selecting a resource availability probability value associated with the sidelink resource based on attempting to decode the control signaling, the log likelihood ratio quality value, and the reference signal received power value, and means for transmitting a sidelink message based on the resource availability probability value.

A non-transitory computer-readable medium storing code for wireless communications at a UE is described. The code may include instructions executable by a processor to receive control signaling for indicating an availability of a sidelink resource, attempt to decode the control signaling, select, based on receiving the control signaling, a log likelihood ratio quality value associated with the control signaling and a reference signal received power value associated with the control signaling, select a resource availability probability value associated with the sidelink resource based on attempting to decode the control signaling, the log likelihood ratio quality value, and the reference signal received power value, and transmit a sidelink message based on the resource availability probability value.

In some examples of the method, apparatuses, and non-transitory computer-readable medium described herein, selecting the resource availability probability value may include operations, features, means, or instructions for selecting a set of multiple reference signal received power thresholds, selecting a set of multiple resource availability probability values corresponding to the set of multiple reference signal received power thresholds, and selecting a resource availability probability value of the set of multiple resource availability probability values based on the reference signal received power value and the set of multiple reference signal received power thresholds.

In some examples of the method, apparatuses, and non-transitory computer-readable medium described herein, selecting the resource availability probability value may include operations, features, means, or instructions for selecting a reference signal received power threshold and selecting a resource availability probability value based on the reference signal received power value and the reference signal received power threshold.

Some examples of the method, apparatuses, and non-transitory computer-readable medium described herein may further include operations, features, means, or instructions for selecting the resource availability probability value may be based on a difference between the reference signal received power value and the reference signal received power threshold.

Some examples of the method, apparatuses, and non-transitory computer-readable medium described herein may further include operations, features, means, or instructions for adjusting the reference signal received power threshold based on an availability of sidelink resources.

In some examples of the method, apparatuses, and non-transitory computer-readable medium described herein, selecting the resource availability probability value may include operations, features, means, or instructions for selecting a reference signal received power threshold, selecting a reference signal received power tolerance range associated with the reference signal received power threshold, and selecting the resource availability probability value based on the reference signal received power value, the reference signal received power threshold, and the reference signal received power tolerance range.

Some examples of the method, apparatuses, and non-transitory computer-readable medium described herein may further include operations, features, means, or instructions for selecting a resource availability probability value may be based on whether the reference signal received power value may be within the reference signal received power tolerance range.

In some examples of the method, apparatuses, and non-transitory computer-readable medium described herein, selecting the resource availability probability value may include operations, features, means, or instructions for obtaining an absolute value of an input or output vector of the log likelihood ratio quality value and selecting the resource availability probability value based on the absolute value.

In some examples of the method, apparatuses, and non-transitory computer-readable medium described herein, selecting the resource availability probability value may include operations, features, means, or instructions for obtaining a signal to noise ratio or a block error rate based on the log likelihood ratio quality value and selecting the resource availability probability value based on the signal to noise ratio or the block error rate.

Some examples of the method, apparatuses, and non-transitory computer-readable medium described herein may further include operations, features, means, or instructions for selecting a resource availability probability may be based on successfully decoding the control signaling.

Some examples of the method, apparatuses, and non-transitory computer-readable medium described herein may further include operations, features, means, or instructions for selecting a resource availability probability may be based on unsuccessfully decoding the control signaling.

In some examples of the method, apparatuses, and non-transitory computer-readable medium described herein, transmitting the sidelink message may include operations, features, means, or instructions for determining whether to transmit the sidelink message on the sidelink resource based on the resource availability probability value.

Some examples of the method, apparatuses, and non-transitory computer-readable medium described herein may further include operations, features, means, or instructions for receiving control signaling indicating one or more reference signal received power thresholds and one or more resource availability probability values.

DETAILED DESCRIPTION

In some wireless communications systems, a wireless device may engage in sidelink communications. The wireless device may select one or more resources associated with the sidelink communications, however, some other different methods for some power-splitting schemes may be deficient. In sidelink wireless communications, a user equipment (UE) may determine resource availability without the aid of a base station to coordinate resource selection. To do so, a UE may attempt to decode sidelink control information (SCI) received from another wireless device, and may measure a reference signal received power (RSRP) associated with the SCI. In some cases, a UE may determine resource availability based on a comparison of the RSRP associated with the SCI and an RSRP threshold. In addition, the UE may determine resource availability based on a successful or unsuccessful decoding of the SCI. However, in such approaches, if the decodability of the SCI is at an "edge" of an error threshold (e.g., a small change in one or more factors could affect the decodability or may change the decodability relative to a threshold such as an RSRP threshold), the UE may incorrectly determine sidelink resource availability. Further, the use of a strict RSRP threshold may also produce errors in determining sidelink resource availability.

A UE may make "soft" determinations using various information, such as access/usage probabilities of, associated with a sidelink resource to reduce errors in sidelink resource availability determinations. The UE may select a probability that a sidelink resource may be available based on whether information, such as the SCI, was successfully decoded, a value such as a log likelihood ratio (LLR) quality value or a measured RSRP value, one or more RSRP thresholds, or a combination thereof, among other factors. In some examples, different RSRP thresholds may be associated with different probabilities, such as different availability probabilities. In some examples, if an RSRP value falls close to an RSRP threshold, the availability probability may be different than in the RSRP value alternatively falls farther away from the RSRP threshold. The UE may determine whether to transmit a sidelink message on the resource in question based on the determined resource availability probability.

Aspects of the disclosure are initially described in the context of wireless communications systems. Aspects of the disclosure are then illustrated by an example system diagram, example resource selection schemes, and an example process flow. Aspects of the disclosure are further illustrated by and described with reference to apparatus diagrams, system diagrams, and flowcharts that relate to soft methods for resource selection based on sidelink control information.

Figure 1:
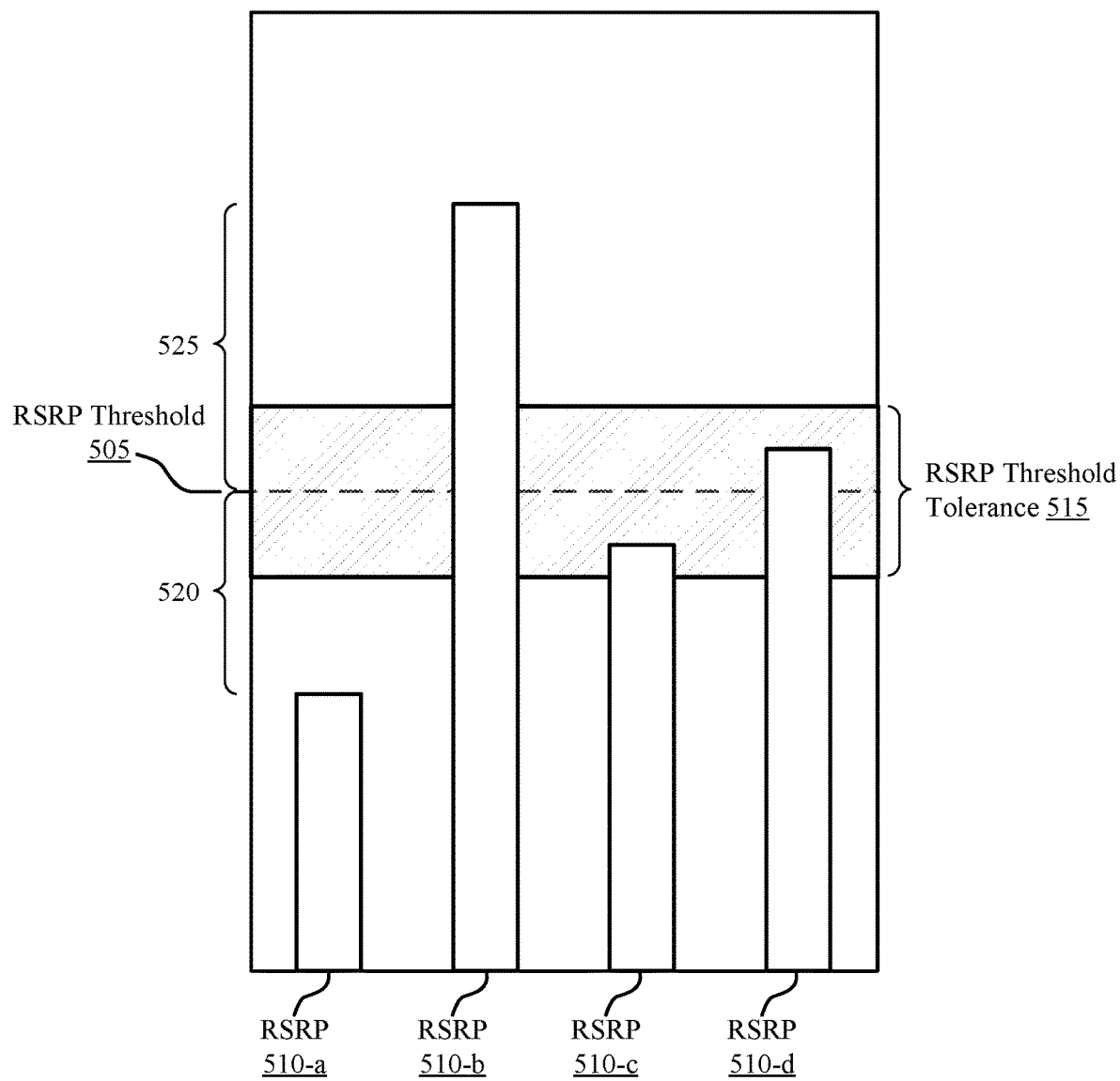
FIG. 1 illustrates an example of a wireless communications system that supports soft methods for resource selection based on sidelink control information in accordance with aspects of the present disclosure.

FIG. 1 illustrates an example of a wireless communications system 100 that supports soft methods for resource selection based on sidelink control information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UE may determine resource availability (e.g., the UE may make a "soft" determination) with or without the aid of a base station to coordinate resource selection. For example, the UE may determine, select, or otherwise obtain an access or usage probability (among other examples) for a resource based on for example, SCI decoding, one or more LLR quality values, one or more RSRP values, or a combination thereof. In some examples, the UE may determine resource availability based on a comparison of the RSRP associated with the SCI and an RSRP threshold. For example, if an RSRP value falls below a threshold, the UE may determine or select an access or usage probability associated with a resource that may be associated with the RSRP value. Additionally or alternatively, the UE may receive, determine, select, or otherwise obtain multiple RSRP threshold values, and, based on one or more RSRP values, determine or select one or more access or usage probability values for one or more resources for one or more sidelink transmissions. In some examples, different RSRP thresholds may be associated with different availability probabilities. In some examples, if an RSRP value falls relatively close to an RSRP threshold (e.g., is within a given amount relative to the RSRP threshold), the availability probability may be different than in the RSRP value falls farther away from the RSRP threshold (e.g., is outside a given amount relative to the RSRP threshold). The UE may determine whether to transmit a sidelink message on the resource in question based on the determined resource availability probability. In this way, sub-optimal determinations or selections in "edge" cases where a metric (e.g., an RSRP value) may lie relatively close to a threshold (e.g., is within a given amount relative to the RSRP threshold) may be reduced or eliminated.

Figure 2:
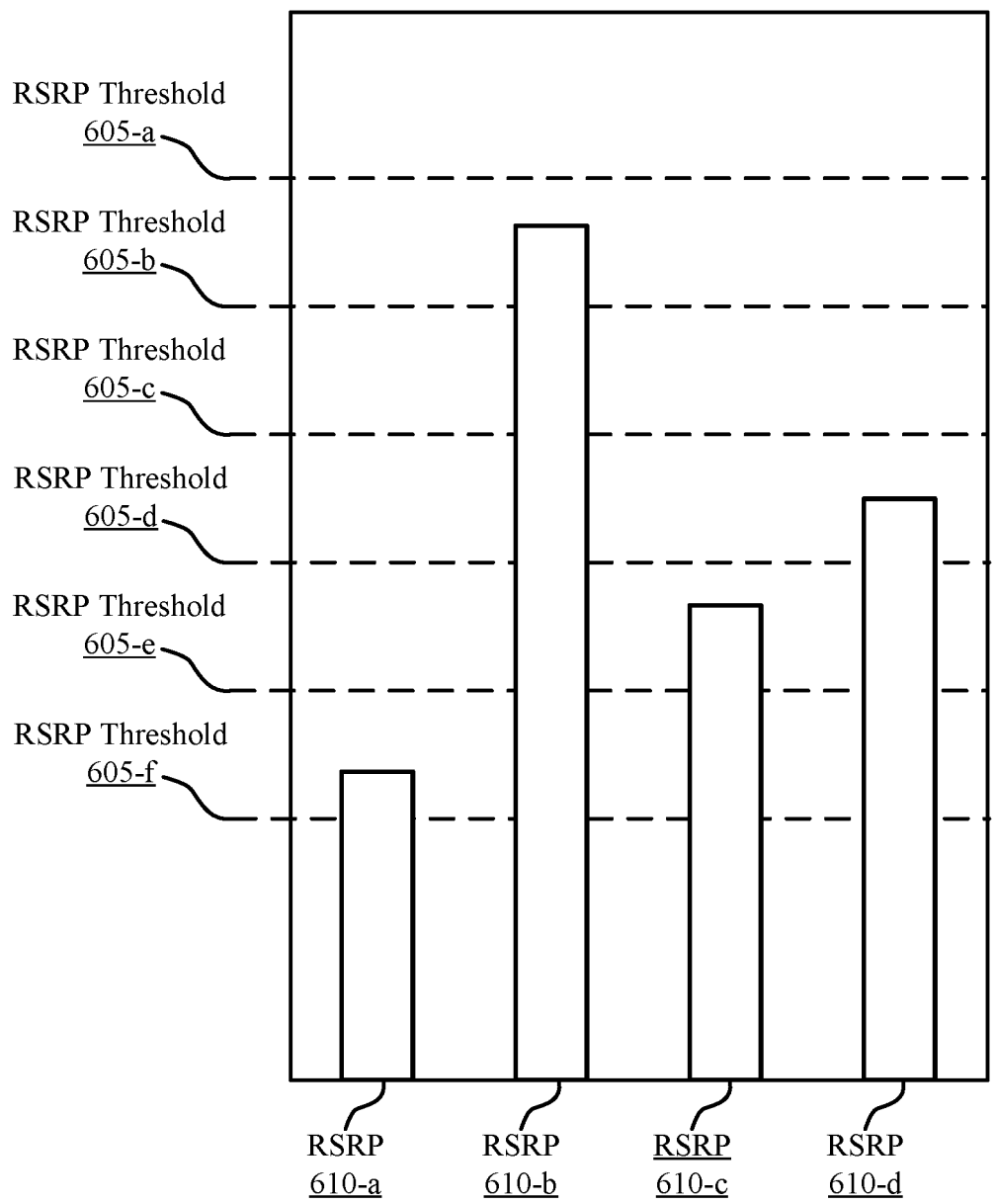
FIG. 2 illustrates an example of a system diagram that supports soft methods for resource selection based on sidelink control information in accordance with aspects of the present disclosure.

FIG. 2 illustrates an example of a wireless communications system 200 that supports soft methods for resource selection based on sidelink control information in accordance with aspects of the present disclosure. The wireless communications system 200 may include a base station 105-a that may be an example of the base station 105 discussed in relation to FIG. 1. The wireless communications system 200 may include UE 115-a and UE 115-b that may be examples of the UEs 115 discussed in relation to FIG. 1. In some examples, the base station 105-a and the UE 115-a may be located in a geographic coverage area 110-a. The base station 105-a may communicate with the UE 115-a via one or more downlink communication links 205-a and one or more uplink communication links 205-b. In some examples, the UE 115-b may be located outside of the geographic coverage area 110-a, while in other examples, the UE 115-b may be located inside of the geographic coverage area 110-a. In some examples, UE 115-a may communicate with UE 115-b via one or more sidelink communication links 210. In some examples, the UE 115-a may be within the geographic coverage area 110-a of the base station 105-a while communicating with the UE 115-b (e.g., sidelink mode 1), and in other examples, the UE 115-a may be outside of the geographic coverage area 110-a of the base station 105-a while communicating with the UE 115-b (e.g., sidelink mode 2).

In some examples, the UE 115-a may receive control signaling 220 that may indicate an availability of one or more sidelink resources. For example, the UE 115-a may receive control signaling 220 that may indicate an availability of one or more sidelink resources from UE 115-b over one or more communication links 210. In some examples, the UE 115-a may receive control signaling 220 from the base station 105-a that may indicate availability of one or more sidelink resources. The control signaling may be of one or more various types (e.g., SCI or other control signaling). In some examples, the UE 115-a may attempt to decode the control signaling. For example, the UE 115-a may attempt to decode SCI received from the UE 115-b to be used in a sidelink resource determination.

In some examples, the UE 115-a may select, one or more values, such as an LLR quality value, that may be associated with the control signaling 220. Additionally or alternatively, the UE 115-a may select one or more values, such as an RSRP value, associated with the control signaling 220. For example, the UE 115-a may decode SCI, and may determine, detect, select, or otherwise obtain an RSRP value associated with the decoded SCI. In some examples, the UE 115-a may determine, detect, select, or otherwise obtain a resource availability probability value. This value may be associated with the control signaling 220, and may be associated with the sidelink resource for which availability may be indicated in the SCI. In some examples, determining, detecting, selecting, or otherwise obtaining this value may be based on the attempt to decode the control signaling (e.g., whether the SCI is successfully or unsuccessfully decoded), the LLR quality value, the RSRP value, or a combination thereof. In some examples, the UE 115-a may determine whether or not to transmit a sidelink message 230. For example, if the UE 115-a selects a resource availability probability value for a sidelink resource that is considered relatively "low," (e.g., is lower than a threshold) then the UE 115-a may determine to not transmit the sidelink message 230 on the sidelink resource and may not transmit the sidelink message on the sidelink resource. However, if the UE 115-a selects a resource availability probability value for a sidelink resource that is considered, for example, to be "adequate," "high," or "satisfactory," then the UE 115-a may determine to transmit the sidelink message on the sidelink resource and may transmit the sidelink message 230 on the sidelink resource. In some examples, the UE 115-a may transmit the sidelink message 230 on the sidelink resource based on the resource availability probability value.

Figure 3:
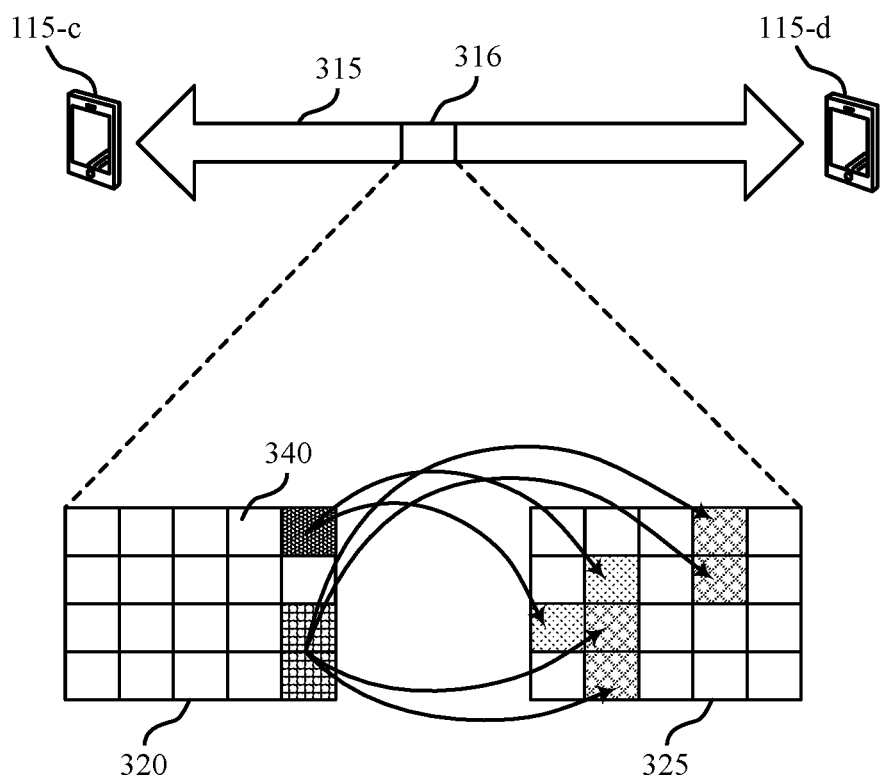
FIG. 3 illustrates an example of a resource selection scheme that supports soft methods for resource selection based on sidelink control information in accordance with aspects of the present disclosure.

FIG. 3 illustrates an example of a resource selection scheme 300 that supports soft methods for resource selection based on sidelink control information in accordance with aspects of the present disclosure. The resource selection scheme 300 may include or involve a UE 115-c, and a UE 115-d, which may be examples of UEs 115 as described with reference to FIG. 1. Additionally, the UE 115-c may communicate with the UE 115-d via a sidelink communication link 315 (e.g., a PC5 link). For example, the UE 115-c may communicate sidelink communications using sidelink resources 316. In some examples, one or both of the UE 115-c and the UE 115-d may perform a resource selection procedure which may include sensing the sidelink resources 316 in a sensing window 320 and reserving resources in a resource selection window 325 of the sidelink resources 316 based on the sensing.

Sidelink communication may be described as communication between two or more wireless devices (e.g., communication between the UE 115-c and the UE 115-d). To facilitate sidelink communication, the UE 115-c and the UE 115-d may be configured with a set of resources (e.g., time and frequency resources) allocated for sidelink communication within one or more sidelink resource pools. A sidelink resource pool may include one or more subchannels in a frequency domain and one or more slots in a time domain. That is, the sidelink resource pool may include multiple resource elements 340.

In some examples, sidelink communication between the UE 115-c and the UE 115-d may be scheduled according to a sidelink resource allocation mode 1. During the sidelink resource allocation mode 1, a base station (e.g., base station 105-a as described herein) may indicate a set of resources within the one or more sidelink resource pools to a transmitting UE, and the transmitting UE may utilize the set of resources for sidelink transmissions. For example, the base station may transmit, to the UE 115-c (e.g., a transmitting UE 115-c), an indication of a set of resources to use to transmit a message to the UE 115-d, and the UE 115-c may utilize one or more resources of the set to transmit the message to the UE 115-d. Alternatively, a transmitting UE 115, such as the UE 115-c, may select resources for sidelink transmissions according to a sidelink resource allocation mode 2. During the sidelink resource allocation mode 2, the UE 115-c may select a set of resources from the one or more sidelink resource pools for sidelink transmissions autonomously (e.g., without signaling or other communication from a base station). For example, the UE 115-c may receive control signaling from the UE 115-d for indicating availability of a sidelink resource. In either case, the UE 115-c may transmit SCI to the UE 115-d indicating the selected set of resources such that the UE 115-d may locate and decode transmissions from the UE 115-c. As such, resource selection may vary between the sidelink resource allocation modes 1 and 2.

When a transmitting UE 115, such as the UE 115-c, is operating in sidelink resource allocation mode 2, the transmitting UE 115-c may perform a channel sensing procedure. In some examples, the UE 115-c may perform channel sensing in the sensing window 320. The sensing window 320 may be associated with the resource selection window 325. The resource selection window 325 may be subsequent to the sensing window 320 in a time domain and may include a set of resource candidates (e.g., resources that the transmitting UE 115-c may potentially transmit on). One or more of the resource candidates may be reserved for sidelink communication by one or more other UEs 115. As such, the UE 115-c may perform channel sensing during the sensing window 320 to determine an available set of resource candidates in the resource selection window 325. Sensing may refer to the UE 115-c monitoring for reference signaling on resource elements 340 of the sensing window 320. For example, the UE 115-c may monitor for SCI of other UEs 115 received on sidelink control resources 330. Decoding SCI of other UEs 115 may inform the UE 115-c which resources of the resource candidates in the resource selection window 325 are reserved for transmission by other UEs 115 (e.g., the reserved resources 335). For example, the UE 115-c may attempt to decode received control signaling (e.g., SCI). In some examples, the UE 115-c may determine that some or all resources of the resource selection window 325 excluding the reserved resources 335 are available. For example, to determine whether one or more resources are available, the UE 115-c may additionally or alternatively measure, determine, select, or otherwise obtain a channel metric (e.g., an RSRP, a LLR quality value, or other value or values) associated with the SCI transmitted by other UEs 115 (or other wireless devices) to determine whether the corresponding reserved resources 335 may be available for a transmission by the UE 115-c. If the UE 115-c determines that the measured signal strength of reference signaling corresponding to a reserved resource 335 is below a threshold, the UE 115-c may include the resource in the available set of resource candidates (e.g., the scheduled transmission in the reserved resource 335 may not interfere with a transmission by the UE 115-c). In some examples, the UE 115-a may select multiple thresholds for determination of resource availability (e.g., multiple RSRP or LLR quality thresholds). In some examples, the UE 115-c may increase or decrease the threshold based on a percentage of available resources in the resource selection window 325 or a priority associated with the scheduled transmission by the UE 115-c.

In some examples, the UE 115-c may select a resource availability probability value based on one or more of the measured, determined, or selected metrics, and such a selection may be one element of a "soft" decision for sidelink resource determination. For example, the UE 115-a may select a resource availability probability value associated with the sidelink resource based on attempting to decode the control signaling, the log likelihood ratio quality, the reference signal received power value, or a combination thereof. Based on one or more such resource availability probability values, the UE 115-a may transmit a sidelink message (e.g., sidelink message 230 discussed with reference to FIG. 2)

Figure 4:
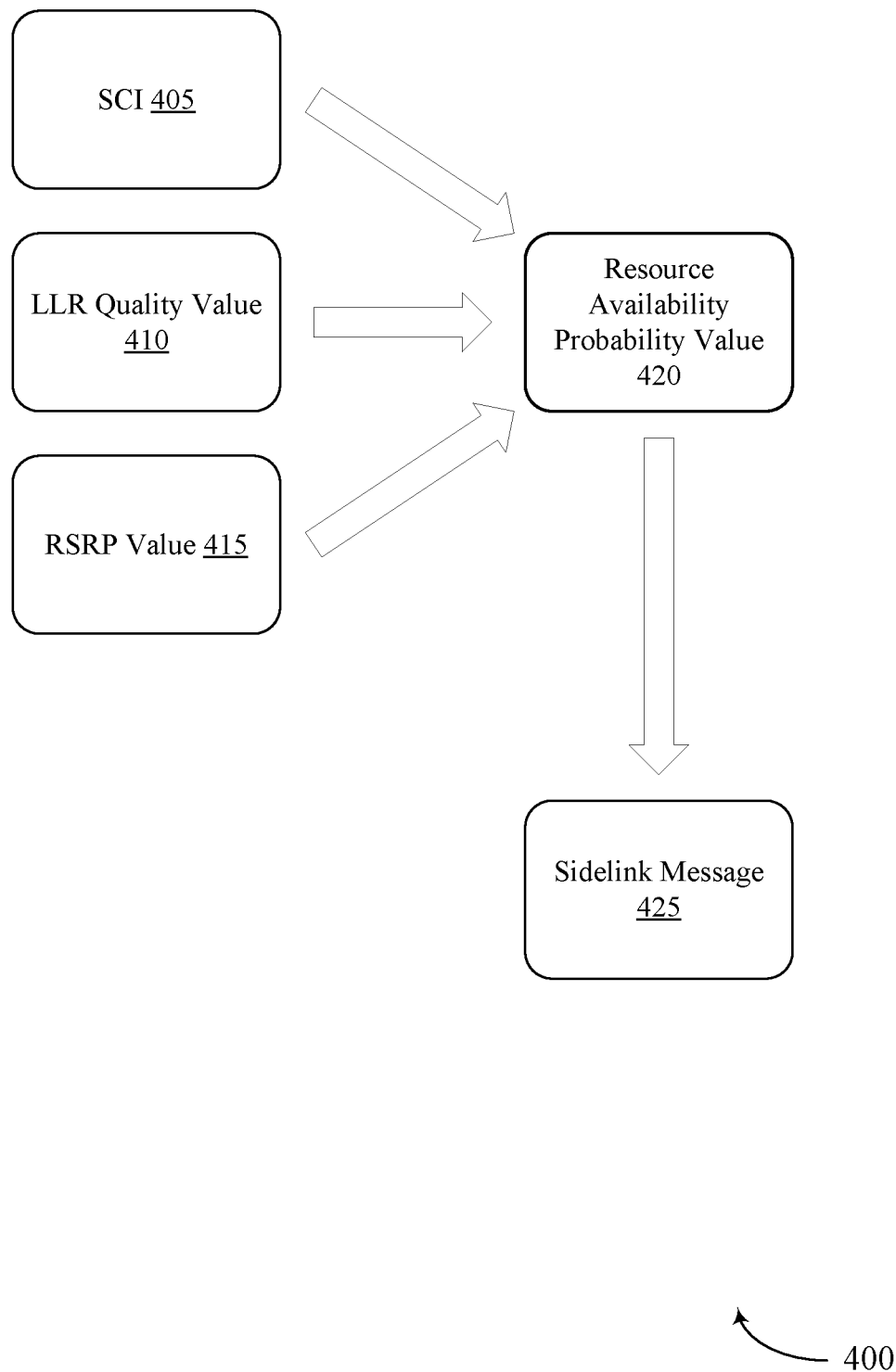
FIG. 4 illustrates an example of a resource selection scheme that supports soft methods for resource selection based on sidelink control information in accordance with aspects of the present disclosure.

FIG. 4 illustrates an example of a resource selection scheme 400 that supports soft methods for resource selection based on sidelink control information in accordance with aspects of the present disclosure. In some examples, a UE may receive control signaling from another wireless device (e.g., a base station or another UE). For example, the UE may receive SCI 405 as depicted in FIG. 4. The UE may attempt to decode the SCI, in some cases to obtain information associated with availability of one or more sidelink resources. For example, the UE may determine that a sidelink resource may be available based (in whole or in part) on successfully decoding the SCI 405 or on unsuccessfully decoding the SCI 405.

In some examples, the UE may select, measure, determine, or otherwise obtain one or more LLR quality values 410, one or more RSRP values 415, or a combination thereof. These one or more values may be used for sidelink resource determination, as discussed herein. For example, a UE may utilize the result of an attempt to decode SCI 405 (e.g., successful decoding or unsuccessful decoding), an LLR quality value 410, and an RSRP value 415 to select, determine, produce, or otherwise obtain a resource availability probability value 420. The resource availability probability value 420 may represent a probability that a resource may be available (e.g., the resource availability probability value 420 may represent an access probability, a usage probability, or other probability associated with a resource). In some examples, the UE may transmit the sidelink message 425 based on the resource availability probability value 420. For example, the UE may use one or more rules or procedures to determine or select, based on the resource availability probability value 420 whether the UE may use the resource to transmit the sidelink message 425. Based on such a determination, the UE may transmit the sidelink message 425 on the sidelink resource.

In some examples, the UE may select or determine a quality for an RSRP signal (e.g., a quality of M for the RSRP value 415). In some examples, the UE may use one or more thresholds between one or more qualities of the RSRP (e.g., one or more regions or quantization areas of RSRP qualities). In some examples, the UE may select or determine a quality for one or more LLRs (e.g., one or more LLR quality values 410). Additionally or alternatively, the UE may select or determine one or more decoding qualities. For example, the UE may select, measure, determine, or otherwise obtain one or more absolute values of an LLR input vector, an LLR output vector, or both. Additionally or alternatively, the UE may select, measure, determine, compute, or otherwise obtain a signal to noise ratio or block error rate from one or more LLRs. In some examples, the selection, measurement, determination, calculation, or obtaining of the one or more RSRP value 415, the one or more LLR quality values 410, or both, may be associated with a successful or an unsuccessful decoding of the SCI 405.

In some examples, if the UE does not successfully decode the SCI 405, the resource availability probability value 420 may be determined or selected based on unsuccessfully decoding the SCI 405. For example, if a resource (e.g., an unallocated or unassigned or undecided resource, a remaining resource, or a resource associated with an unknown status) may be assigned an associated resource availability probability value 420, and the resource availability probability value 420 may be added to a resource list. However, the UE may successfully decode the SCI 405 with, for example, one or more LLRs or other decoding quality metrics of a quality 1. and one or more RSRP values 415 of a quality m. In some such cases, the UE may access the associated resource or resources with a resource availability probability value 420 $p_{ki}$. That is, the access or usage probability (e.g., resource availability probability value 420) may depend on a quality of an LLR quality value 410, an RSRP value 415, or a combination thereof. The UE may determine, based on one or more rules or procedures, which probability values or ranges of values may indicate that the UE is to transmit on the sidelink resource, and which probability values or ranges of values may indicate that the UE is not to transmit on the sidelink resource.

Figure 5:
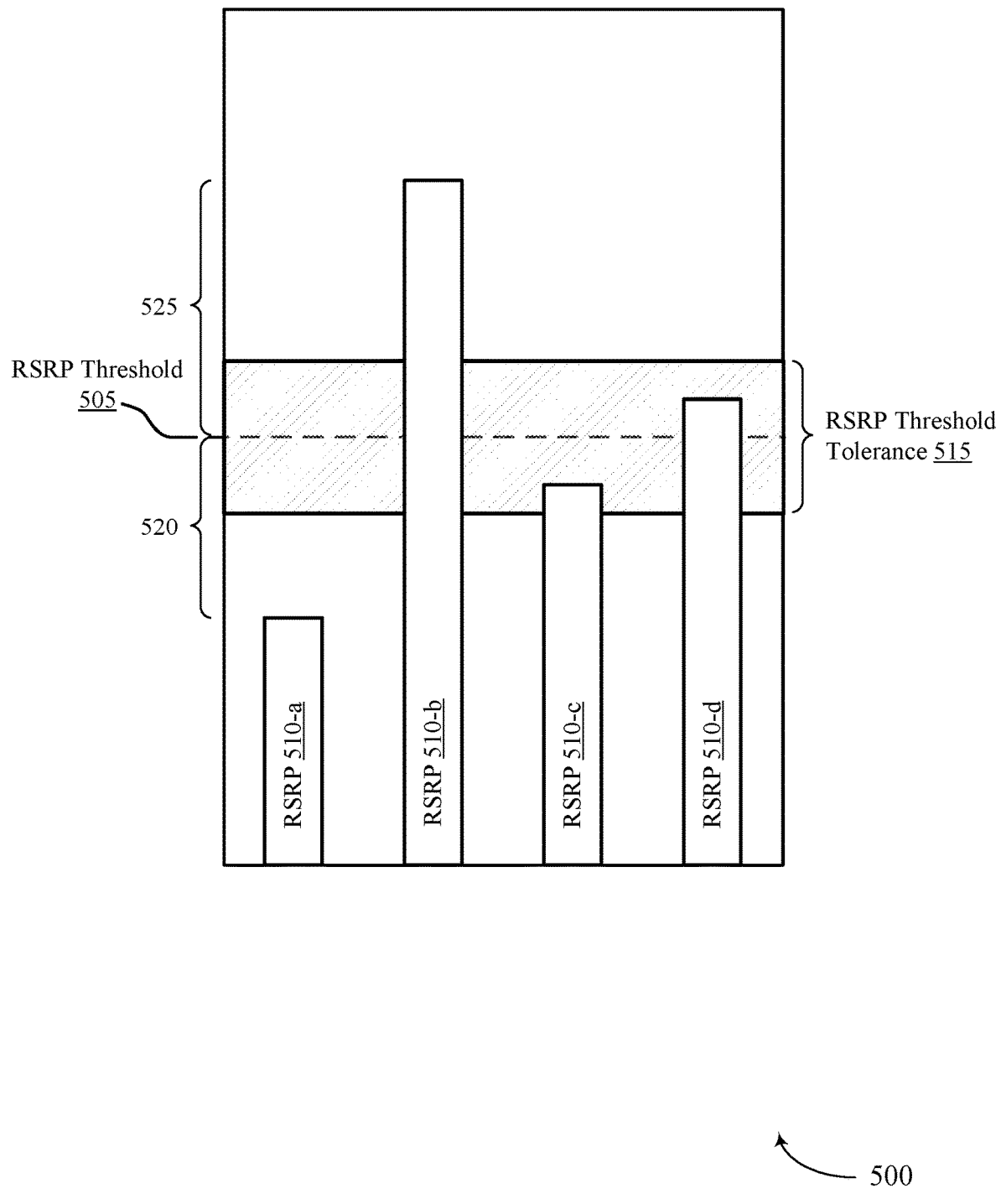
FIG. 5 illustrates an example of a resource selection scheme that supports soft methods for resource selection based on sidelink control information in accordance with aspects of the present disclosure.

FIG. 5 illustrates an example of a resource selection scheme 500 that supports soft methods for resource selection based on sidelink control information in accordance with aspects of the present disclosure. In the resource selection scheme 500, an RSRP threshold 505 may be used as a metric to which various RSRPs 510 (e.g., RSRP values) may be compared (e.g., in the course of sidelink resource determination as discussed herein). In some examples, the RSRP threshold 505 may be preconfigured, may be configured, assigned, selected, determined, or otherwise obtained based on one or more rules or procedures. In some examples, the RSRP threshold 505 may configured, assigned, selected, determined, or otherwise obtained based on control signaling received by the UE (e.g., control signaling from a base station, from another UE, from a network entity, a wireless device, or from another source).

In some examples, the resource selection scheme 500 may include multiple (e.g., two) states for SCI decoding and may include one state of RSRP thresholding (e.g., a single RSRP threshold, such as RSRP threshold 505). In some such examples, there may be multiple (e.g., three) potential states of interest. For example, a first state may be a state in which a UE unsuccessfully decodes one or more SCIs. In such an example, the UE may access a resource associated with an unsuccessfully decoded SCI (e.g., an undecided resource, a remaining resource, or a resource associated with an unknown status) with a resource availability probability value (e.g., probability p0), and the resource availability probability value may be added to a resource list. A second state may be a state in which the UE may successfully decode the SCI, and an associated RSRP (e.g., RSRP 510-a) may be below an RSRP threshold (e.g., RSRP threshold 505), and the UE may access the associated resource with a probability value (e.g., a resource availability probability value p1). A third state may be a state in which the UE may successfully decode the SCI, and an associated RSRP (e.g., RSRP 510-b) may be above an RSRP threshold (e.g., RSRP threshold 505), and the UE may access the associated resource with a probability value (e.g., a resource availability probability value p2).

In some examples, the resource availability probability value that may be determined or selected based (in whole or in part) on an RSRP value may be influenced, adjusted, or further based on a difference between the RSRP value and an RSRP threshold (e.g., the RSRP threshold 505). For example, the resource availability probability value associated with RSRP 510-a may be based at least in part on distance 520 that may represent a difference between the value of RSRP 510-a and the RSRP threshold 505. Similarly, distance 525 may represent a difference between the value of RSRP 510-b and the RSRP threshold 505.

In some examples, the resource selection scheme 500 may include two states for SCI decoding (e.g., successful decoding and unsuccessful decoding), and may include multiple (e.g., two) states of RSRP thresholding (e.g., a single RSRP threshold, such as RSRP threshold 505, and an RSRP threshold tolerance 515). In some such examples, there may be multiple (e.g., five) potential states of interest.

An example first state may be a state in which a UE unsuccessfully decodes one or more SCIs. In such an example, the UE may access a resource associated with an unsuccessfully decoded SCI (e.g., an undecided resource, a remaining resource, or a resource associated with an unknown status) with a resource availability probability value (e.g., probability p0), and the resource availability probability value may be added to a resource list.

An example second state may be a state in which the UE may successfully decode the SCI, and an associated RSRP (e.g., RSRP 510-a) may be below an RSRP threshold (e.g., RSRP threshold 505) and fall outside a tolerance range near the threshold (e.g., RSRP threshold tolerance 515). In some such examples, the UE may access the associated resource with a probability value (e.g., a resource availability probability value p1) based on the RSRP 510-a falling below the RSRP threshold 505 and outside of the RSRP threshold tolerance 515 (e.g., below the threshold and far away from the threshold).

An example third state may be a state in which the UE may successfully decode the SCI, and an associated RSRP (e.g., RSRP 510-b) may be above an RSRP threshold (e.g., RSRP threshold 505) and fall outside a tolerance range near the threshold (e.g., RSRP threshold tolerance 515). In some such examples, the UE may access the associated resource with a probability value (e.g., a resource availability probability value p2) based on the RSRP 510-a falling above the RSRP threshold 505 and outside of the RSRP threshold tolerance 515 (e.g., above the threshold and far away from the threshold).

An example fourth state may be a state in which the UE may successfully decode the SCI, and an associated RSRP (e.g., RSRP 510-c) may be below an RSRP threshold (e.g., RSRP threshold 505) and fall inside a tolerance range near the threshold (e.g., RSRP threshold tolerance 515). In some such examples, the UE may access the associated resource with a probability value (e.g., a resource availability probability value p3) based on the RSRP 510-a falling below the RSRP threshold 505 and inside of the RSRP threshold tolerance 515 (e.g., below the threshold and near the threshold).

An example fifth state may be a state in which the UE may successfully decode the SCI, and an associated RSRP (e.g., RSRP 510-d) may be above an RSRP threshold (e.g., RSRP threshold 505) and fall inside a tolerance range near the threshold (e.g., RSRP threshold tolerance 515). In some such examples, the UE may access the associated resource with a probability value (e.g., a resource availability probability value p4) based on the RSRP 510-a falling above the RSRP threshold 505 and outside of the RSRP threshold tolerance 515 (e.g., above the threshold and far away from the threshold).

Figure 6:
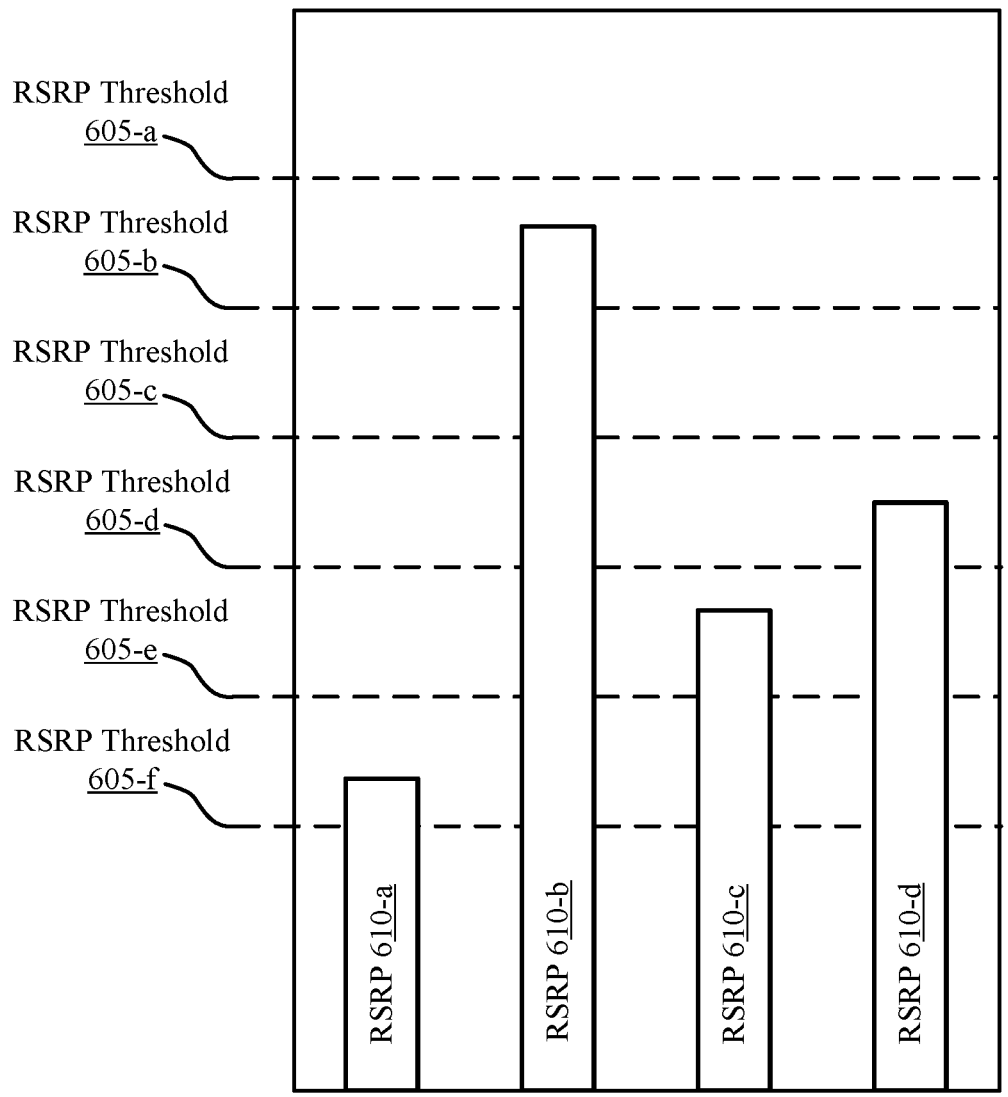
FIG. 6 illustrates an example of a resource selection scheme that supports soft methods for resource selection based on sidelink control information in accordance with aspects of the present disclosure.

FIG. 6 illustrates an example of a resource selection scheme 600 that supports soft methods for resource selection based on sidelink control information in accordance with aspects of the present disclosure. In some examples, a resource selection scheme (e.g., resource selection scheme 600) may include or involve one or more RSRP thresholds (e.g., RSRP thresholds 605), and some or all of the RSRP thresholds may each be associated with a resource availability probability value. For example, a resource availability probability value may be determined or selected based on an RSRP value or where the RSRP value falls in relation to one or more RSRP thresholds (e.g., RSRP thresholds 605). In some examples, a UE may unsuccessfully decode one or more SCIs. In such an example, the UE may access a resource associated with an unsuccessfully decoded SCI (e.g., an undecided resource, a remaining resource, or a resource associated with an unknown status) with a resource availability probability value (e.g., probability p0), and the resource availability probability value may be added to a resource list.

In some examples, the example resource selection scheme 600 may include or involve one or more states for RSRP values (e.g., RSRPs 610 as depicted in FIG. 6). In some examples, a number of RSRP thresholds 605 may be based on a number of states for RSRP values. For example, as shown in FIG. 6, the resource selection scheme 600 may include RSRP thresholds 605-*a*, 605-*b*, 605-*c*, 605-*d*, 605-*e*, and 605-*f*. In some examples, each RSRP threshold, one or more sets of values between two RSRP thresholds, one or more sets of values above or below one or more RSRP thresholds, or a combination thereof, may be associated with one or more resource availability probability values. For example, since RSRP 610-*a* may fall between RSRP threshold 605-*e* and RSRP threshold 605-*f*, RSRP 610 may be associated with a first resource availability probability value, whereas RSRP 610-*b*, which may fall between RSRP threshold 605-*b* and RSRP threshold 605-*a*, may be associated with a second resource availability probability value. In a further example, if, in an example resource selection scheme that may include M number of possible RSRP states, the UE successfully decodes an SCI and an RSRP (e.g., an RSRP 610) is of a quality k corresponding to one of the M number of states, the UE may access an associated resource with a probability pk. Various combinations of RSRP thresholds 605 and associated resource availability probability values are possible, and may result in different resource selection schemes which are contemplated by the present disclosure.

Figure 7:
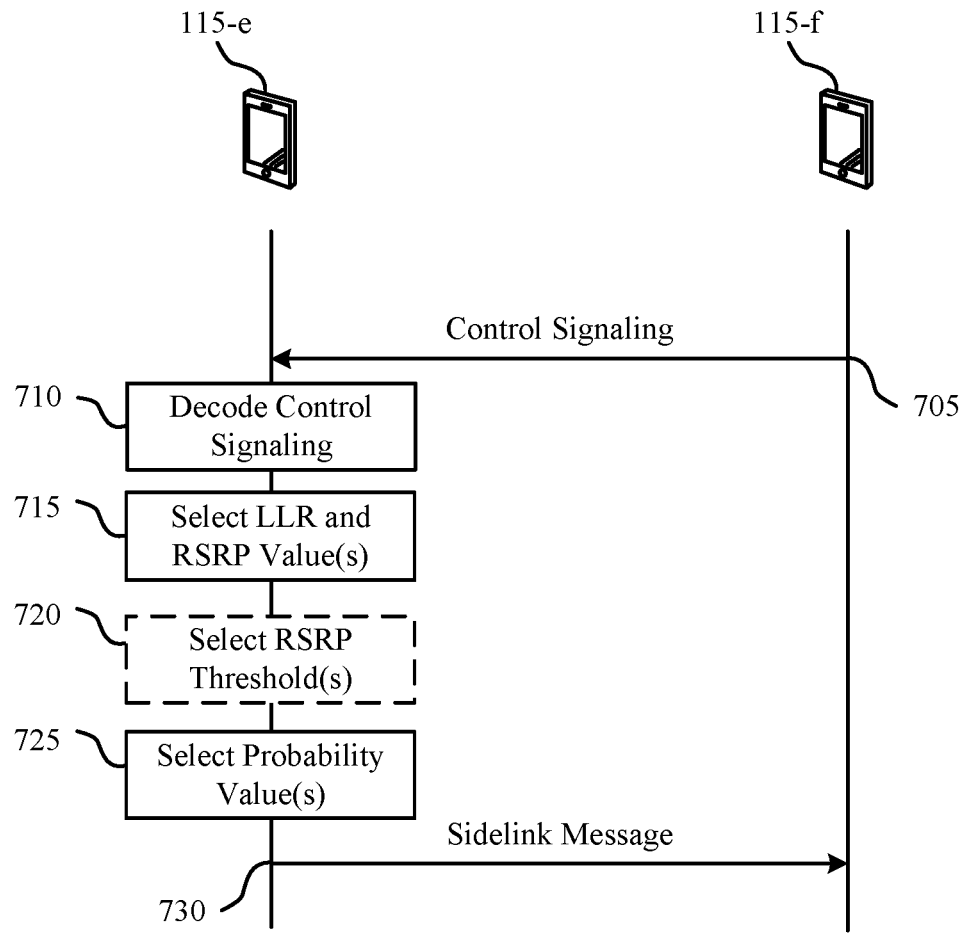
FIG. 7 illustrates an example of a process flow that supports soft methods for resource selection based on sidelink control information in accordance with aspects of the present disclosure.

FIG. 7 illustrates an example of a process flow 700 that supports soft methods for resource selection based on sidelink control information in accordance with aspects of the present disclosure. The process flow 700 may implement or may be implemented by various aspects of the present disclosure described with reference to FIGS. 1-4. The process flow 700 may include a first UE 115-*e* and a second UE 115-*f*, which may be examples UEs 115 as described with reference to FIGS. 1-6. In some examples, the first UE 115-*e*, the second UE 115-*f*, or both, may be configured with a sidelink resource selection capability as described herein.

In the following description of the process flow 700, the operations between the first UE 115-*e* and the second UE 705 may be performed in different orders or at different times. Some operations may also be left out of the process flow 700, or other operations may be added. Although the first UE 115-*e* and the second UE 705 are shown performing the operations of the process flow 700, some aspects of some operations may also be performed by one or more other wireless devices.

At 705, the first UE 115-*e* may receive control signaling for indicating an availability of a sidelink resource. In some examples, the UE 115-*e* may receive control signaling indicating one or more reference signal received power thresholds and one or more resource availability probability values. At 710, the first UE 115-*e* may attempt to decode the control signaling.

At 715, the first UE 115-*e* may select, based on receiving the control signaling, a log likelihood ratio quality value that may be associated with the control signaling and a reference signal received power value that may be associated with the control signaling. In some examples, the UE 115-*e* may obtain an absolute value of an input or output vector of the log likelihood ratio quality value. In some examples, the UE 115-*e* may obtain a signal to noise ratio or a block error rate based on the log likelihood ratio quality value.

At 720, the first UE 115-*e* may select a plurality of reference signal received power thresholds. In some examples, the UE 115-*e* may select a reference signal received power threshold, that may, in some examples, be a single reference signal received power threshold. In some examples, the UE 115-*e* may adjust the reference signal received power threshold based on an availability of sidelink resources.

At 725, the first UE 115-*e* may select a resource availability probability value associated with the sidelink resource based on attempting to decode the control signaling, the log likelihood ratio quality, and the reference signal received power value. In some examples, the UE 115-*e* may select a plurality of resource availability probability values that may correspond to the plurality of reference signal received power thresholds. In some examples, the UE 115-*e* may select a resource availability probability value of the plurality of resource availability probability values based on the reference signal received power value and the plurality of reference signal received power thresholds. In some examples, the UE 115-*e* may select a resource availability probability value based on the reference signal received power value (in some cases, a single reference signal received power value) the reference signal received power threshold, or a combination thereof.

In some examples, the UE 115-*e* may select the resource availability probability value based on a difference between the reference signal received power value and the reference signal received power threshold. In some examples, the UE 115-*e* may select a reference signal received power tolerance range associated with the reference signal received power threshold. In some such examples, the UE 115-*e* may select the resource availability probability value based on the reference signal received power value, the reference signal received power threshold, the reference signal received power tolerance range, or a combination thereof. In some examples, selecting a resource availability probability value may be based on whether the reference signal received power value is within the reference signal received power tolerance range. In some examples, the UE 115-*e* may select the resource availability probability value based on the absolute value of the input or output vector of the log likelihood ratio quality value. In some examples, the UE 115-*e* may select the resource availability probability value based on the signal to noise ratio or the block error rate (or some combination). In some examples, the UE 115-*e* may select a resource availability probability based on successfully decoding the control signaling. In some examples, the UE 115-*e* may select a resource availability probability based on unsuccessfully decoding the control signaling.

At 730, the first UE 115-*e* may transmit a sidelink message based on the resource availability probability value. In some examples, the UE 115-*e* may determine whether to transmit the sidelink message on the sidelink resource based on the resource availability probability value.

Figure 8:
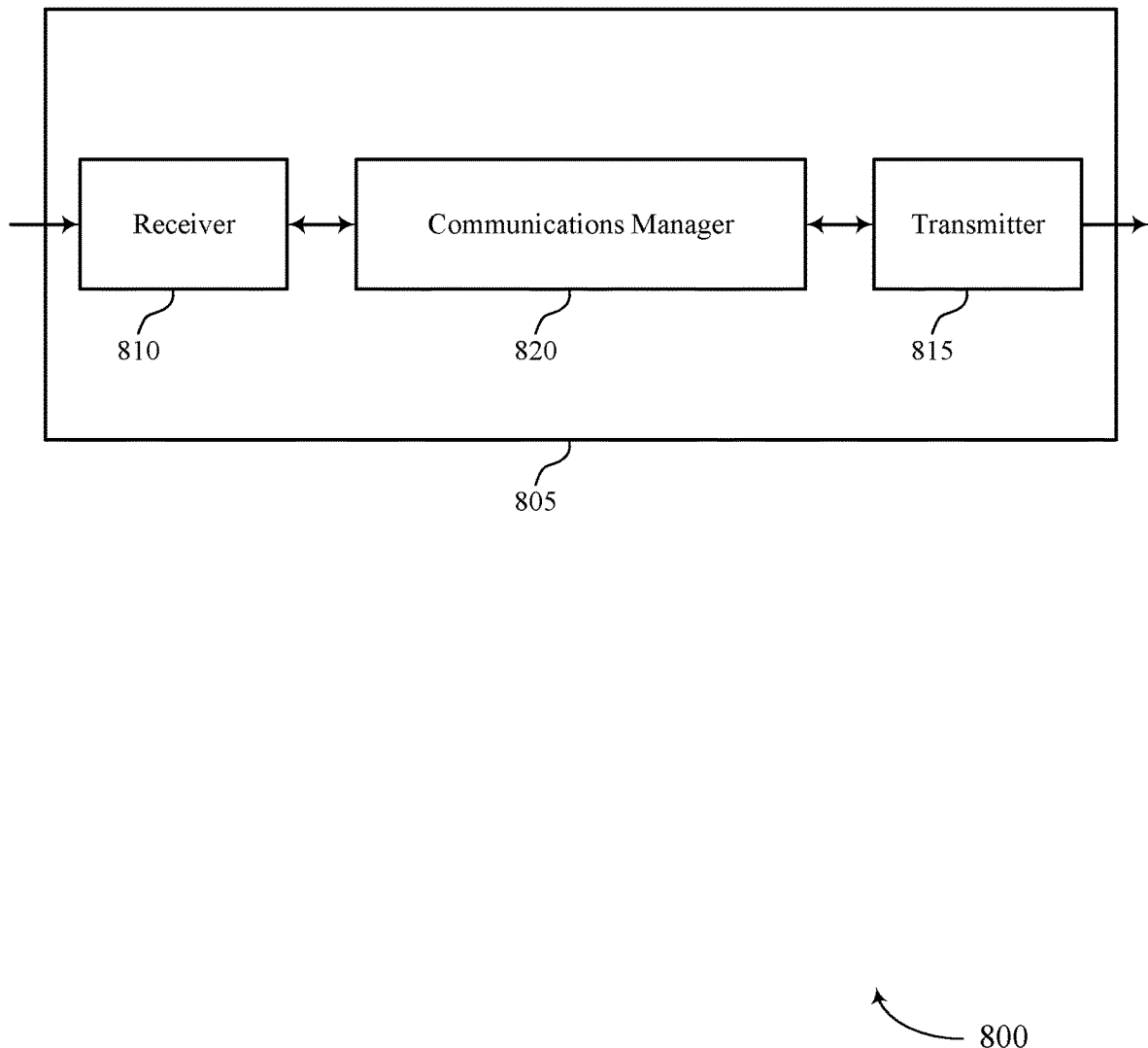
FIGS. 8 and 9 show block diagrams of devices that support soft methods for resource selection based on sidelink control information in accordance with aspects of the present disclosure.

FIG. 8 shows a block diagram 800 of a device 805 that supports soft methods for resource selection based on sidelink control information in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to soft methods for resource selection based on sidelink control information). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to soft methods for resource selection based on sidelink control information). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of soft methods for resource selection based on sidelink control information as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving control signaling for indicating an availability of a sidelink resource. The communications manager 820 may be configured as or otherwise support a means for attempting to decode the control signaling. The communications manager 820 may be configured as or otherwise support a means for selecting, based on receiving the control signaling, a log likelihood ratio quality value associated with the control signaling and a reference signal received power value associated with the control signaling. The communications manager 820 may be configured as or otherwise support a means for selecting a resource availability probability value associated with the sidelink resource based on attempting to decode the control signaling, the log likelihood ratio quality, and the reference signal received power value. The communications manager 820 may be configured as or otherwise support a means for transmitting a sidelink message based on the resource availability probability value.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, more efficient utilization of communication resources, or a combination thereof.

Figure 9:
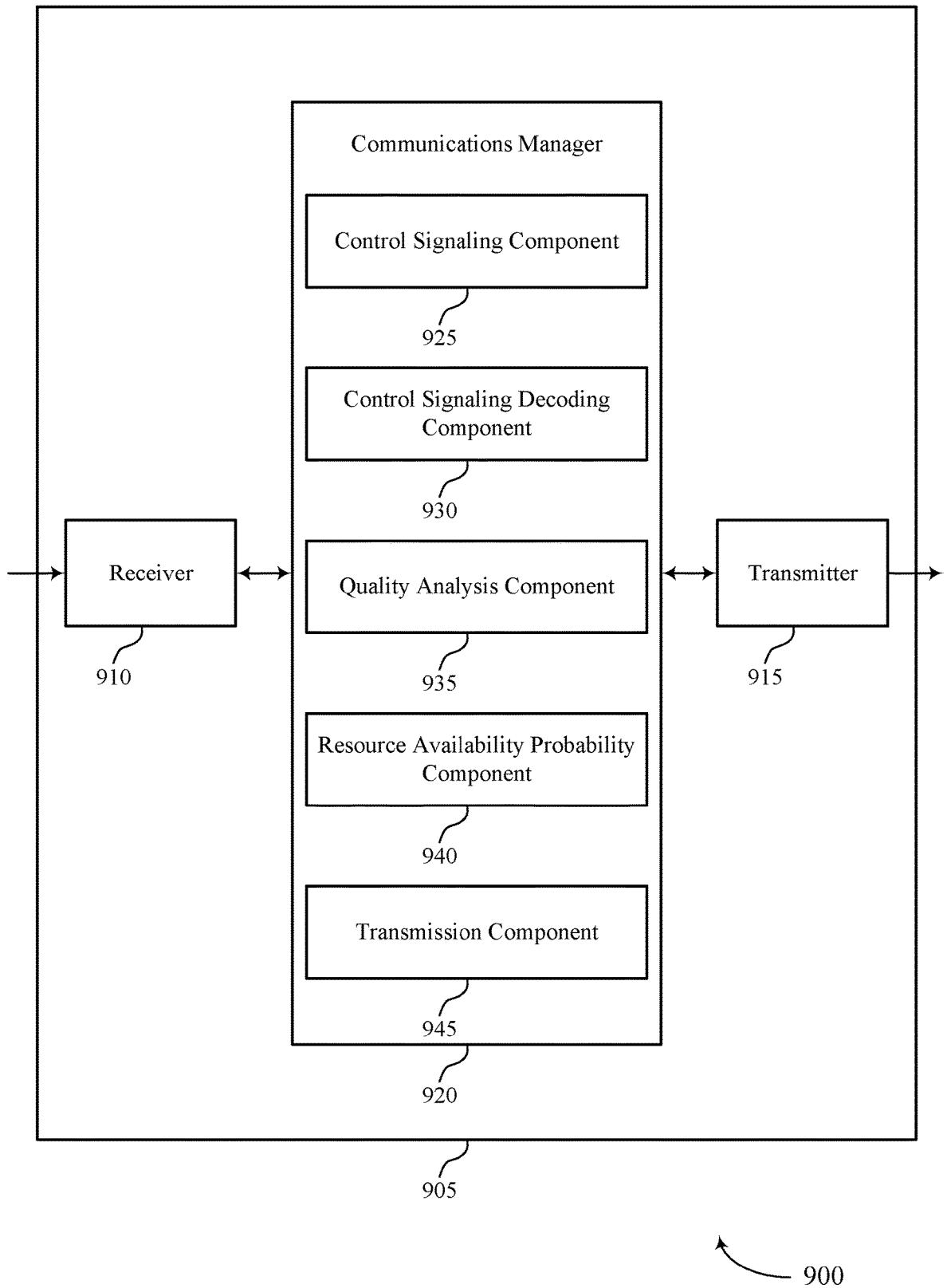

FIG. 9 shows a block diagram 900 of a device 905 that supports soft methods for resource selection based on sidelink control information in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to soft methods for resource selection based on sidelink control information). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to soft methods for resource selection based on sidelink control information). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of soft methods for resource selection based on sidelink control information as described herein. For example, the communications manager 920 may include a control signaling component 925, a control signaling decoding component 930, a quality analysis component 935, a resource availability probability component 940, a transmission component 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The control signaling component 925 may be configured as or otherwise support a means for receiving control signaling for indicating an availability of a sidelink resource. The control signaling decoding component 930 may be configured as or otherwise support a means for attempting to decode the control signaling. The quality analysis component 935 may be configured as or otherwise support a means for selecting, based on receiving the control signaling, a log likelihood ratio quality value associated with the control signaling and a reference signal received power value associated with the control signaling. The resource availability probability component 940 may be configured as or otherwise support a means for selecting a resource availability probability value associated with the sidelink resource based on attempting to decode the control signaling, the log likelihood ratio quality, and the reference signal received power value. The transmission component 945 may be configured as or otherwise support a means for transmitting a sidelink message based on the resource availability probability value.

Figure 10:
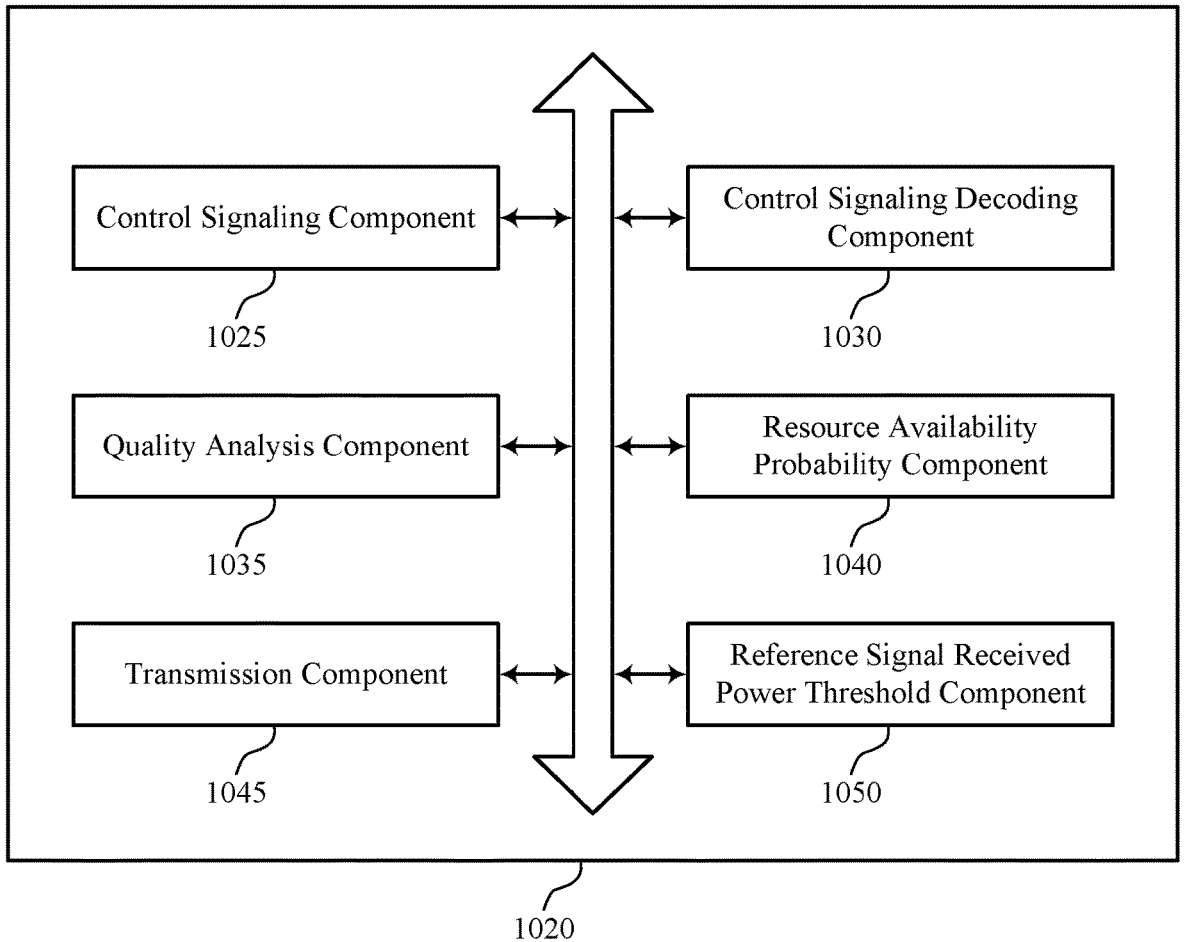
FIG. 10 shows a block diagram of a communications manager that supports soft methods for resource selection based on sidelink control information in accordance with aspects of the present disclosure.

FIG. 10 shows a block diagram 1000 of a communications manager 1020 that supports soft methods for resource selection based on sidelink control information in accordance with aspects of the present disclosure. The communications manager 1020 may be an example of aspects of a communications manager 820, a communications manager 920, or both, as described herein. The communications manager 1020, or various components thereof, may be an example of means for performing various aspects of soft methods for resource selection based on sidelink control information as described herein. For example, the communications manager 1020 may include a control signaling component 1025, a control signaling decoding component 1030, a quality analysis component 1035, a resource availability probability component 1040, a transmission component 1045, a reference signal received power threshold component 1050, or any combination thereof. Each of these components may communicate, directly or indirectly, with one another (e.g., via one or more buses).

The communications manager 1020 may support wireless communications at a UE in accordance with examples as disclosed herein. The control signaling component 1025 may be configured as or otherwise support a means for receiving control signaling for indicating an availability of a sidelink resource. The control signaling decoding component 1030 may be configured as or otherwise support a means for attempting to decode the control signaling. The quality analysis component 1035 may be configured as or otherwise support a means for selecting, based on receiving the control signaling, a log likelihood ratio quality value associated with the control signaling and a reference signal received power value associated with the control signaling. The resource availability probability component 1040 may be configured as or otherwise support a means for selecting a resource availability probability value associated with the sidelink resource based on attempting to decode the control signaling, the log likelihood ratio quality, and the reference signal received power value. The transmission component 1045 may be configured as or otherwise support a means for transmitting a sidelink message based on the resource availability probability value.

In some examples, to support selecting the resource availability probability value, the reference signal received power threshold component 1050 may be configured as or otherwise support a means for selecting a set of multiple reference signal received power thresholds. In some examples, to support selecting the resource availability probability value, the resource availability probability component 1040 may be configured as or otherwise support a means for selecting a set of multiple resource availability probability values corresponding to the set of multiple reference signal received power thresholds. In some examples, to support selecting the resource availability probability value, the resource availability probability component 1040 may be configured as or otherwise support a means for selecting a resource availability probability value of the set of multiple resource availability probability values based on the reference signal received power value and the set of multiple reference signal received power thresholds.

In some examples, to support selecting the resource availability probability value, the reference signal received power threshold component 1050 may be configured as or otherwise support a means for selecting a reference signal received power threshold. In some examples, to support selecting the resource availability probability value, the resource availability probability component 1040 may be configured as or otherwise support a means for selecting a resource availability probability value based on the reference signal received power value and the reference signal received power threshold.

In some examples, the resource availability probability component 1040 may be configured as or otherwise support a means for selecting the resource availability probability value is based on a difference between the reference signal received power value and the reference signal received power threshold.

In some examples, the reference signal received power threshold component 1050 may be configured as or otherwise support a means for adjusting the reference signal received power threshold based on an availability of sidelink resources.

In some examples, to support selecting the resource availability probability value, the reference signal received power threshold component 1050 may be configured as or otherwise support a means for selecting a reference signal received power threshold. In some examples, to support selecting the resource availability probability value, the reference signal received power threshold component 1050 may be configured as or otherwise support a means for selecting a reference signal received power tolerance range associated with the reference signal received power threshold. In some examples, to support selecting the resource availability probability value, the resource availability probability component 1040 may be configured as or otherwise support a means for selecting the resource availability probability value based on the reference signal received power value, the reference signal received power threshold, and the reference signal received power tolerance range.

In some examples, selecting a resource availability probability value is based on whether the reference signal received power value is within the reference signal received power tolerance range.

In some examples, to support selecting the resource availability probability value, the quality analysis component 1035 may be configured as or otherwise support a means for obtaining an absolute value of an input or output vector of the log likelihood ratio quality value. In some examples, to support selecting the resource availability probability value, the resource availability probability component 1040 may be configured as or otherwise support a means for selecting the resource availability probability value based on the absolute value.

In some examples, to support selecting the resource availability probability value, the quality analysis component 1035 may be configured as or otherwise support a means for obtaining a signal to noise ratio or a block error rate based on the log likelihood ratio quality value. In some examples, to support selecting the resource availability probability value, the resource availability probability component 1040 may be configured as or otherwise support a means for selecting the resource availability probability value based on the signal to noise ratio or the block error rate.

In some examples, the resource availability probability component 1040 may be configured as or otherwise support a means for selecting a resource availability probability is based on successfully decoding the control signaling. In some examples, the resource availability probability component 1040 may be configured as or otherwise support a means for selecting a resource availability probability is based on unsuccessfully decoding the control signaling. In some examples, to support transmitting the sidelink message, the transmission component 1045 may be configured as or otherwise support a means for determining whether to transmit the sidelink message on the sidelink resource based on the resource availability probability value. In some examples, the control signaling component 1025 may be configured as or otherwise support a means for receiving control signaling indicating one or more reference signal received power thresholds and one or more resource availability probability values.

Figure 11:
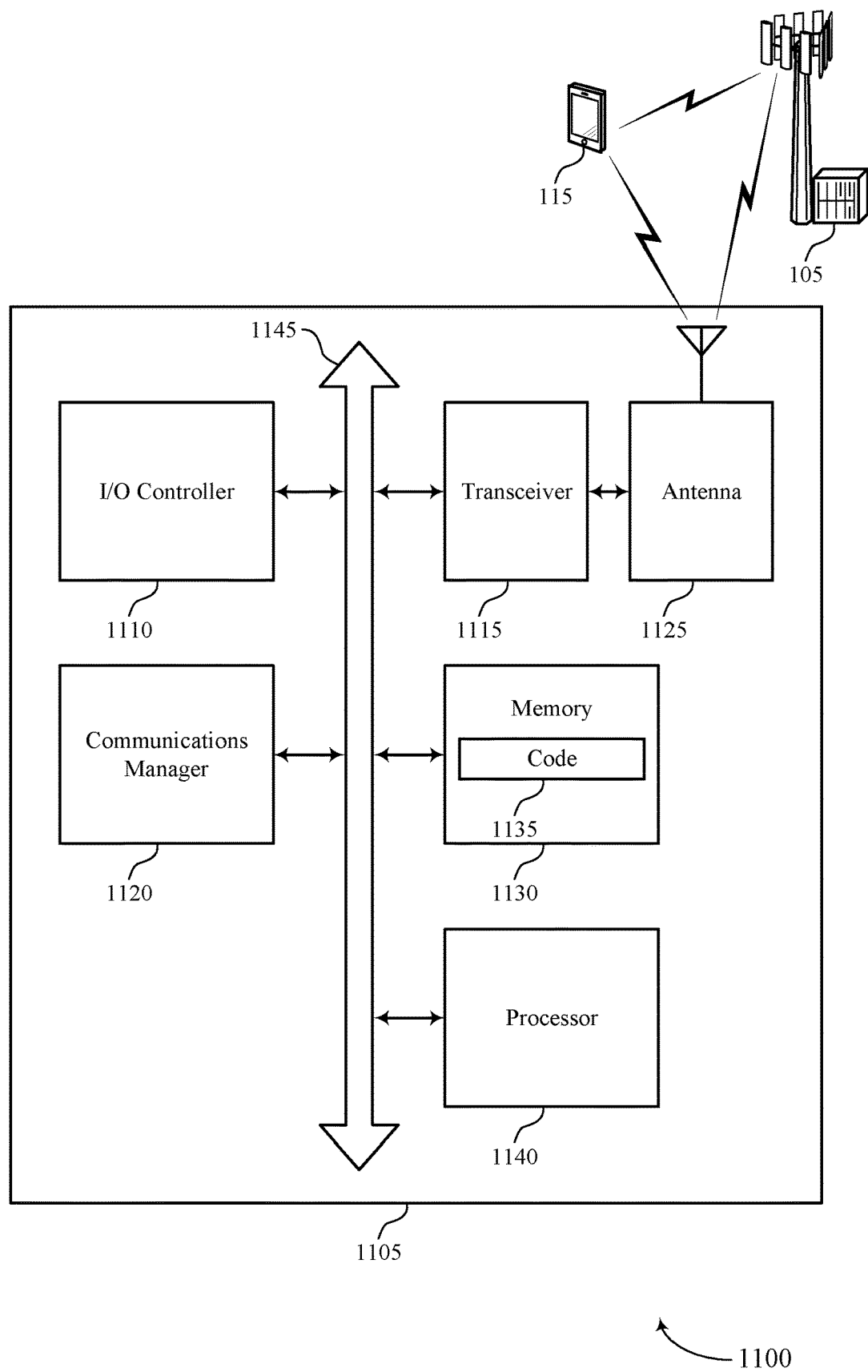
FIG. 11 shows a diagram of a system including a device that supports soft methods for resource selection based on sidelink control information in accordance with aspects of the present disclosure.

FIG. 11 shows a diagram of a system 1100 including a device 1105 that supports soft methods for resource selection based on sidelink control information in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting soft methods for resource selection based on sidelink control information). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving control signaling for indicating an availability of a sidelink resource. The communications manager 1120 may be configured as or otherwise support a means for attempting to decode the control signaling. The communications manager 1120 may be configured as or otherwise support a means for selecting, based on receiving the control signaling, a log likelihood ratio quality value associated with the control signaling and a reference signal received power value associated with the control signaling. The communications manager 1120 may be configured as or otherwise support a means for selecting a resource availability probability value associated with the sidelink resource based on attempting to decode the control signaling, the log likelihood ratio quality, and the reference signal received power value. The communications manager 1120 may be configured as or otherwise support a means for transmitting a sidelink message based on the resource availability probability value.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of soft methods for resource selection based on sidelink control information as described herein, or the processor 1140 and the memory 1130 may be otherwise configured to perform or support such operations.

Figure 12:
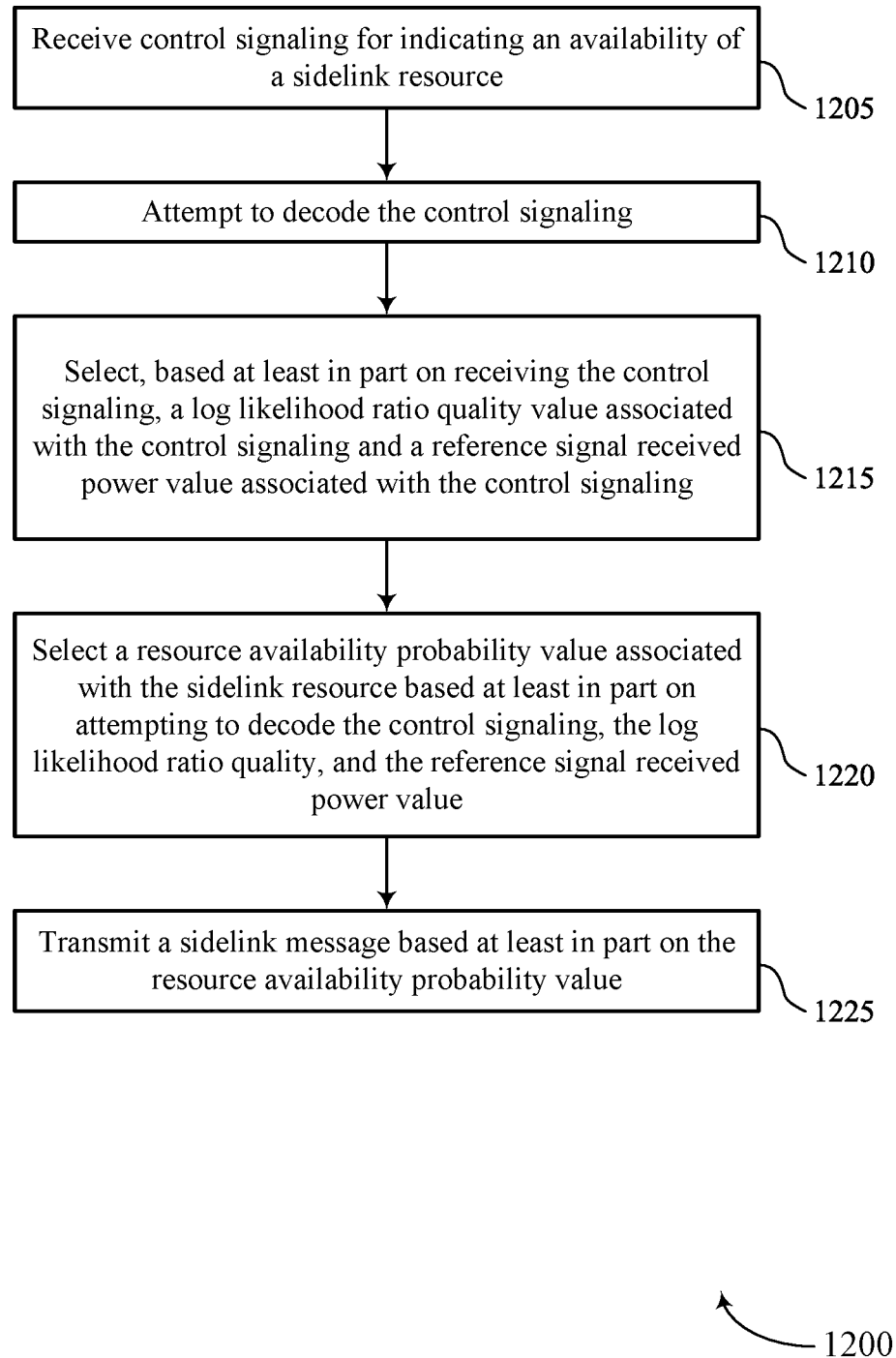
FIGS. 12 through 15 show flowcharts illustrating methods that support soft methods for resource selection based on sidelink control information in accordance with aspects of the present disclosure.

FIG. 12 shows a flowchart illustrating a method 1200 that supports soft methods for resource selection based on sidelink control information in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include receiving control signaling for indicating an availability of a sidelink resource. The operations of 1205 may be performed in accordance with examples as disclosed herein. In some examples, aspects of the operations of 1205 may be performed by a control signaling component 1025 as described with reference to FIG. 10.

At 1210, the method may include attempting to decode the control signaling. The operations of 1210 may be performed in accordance with examples as disclosed herein. In some examples, aspects of the operations of 1210 may be performed by a control signaling decoding component 1030 as described with reference to FIG. 10.

At 1215, the method may include selecting, based on receiving the control signaling, a log likelihood ratio quality value associated with the control signaling and a reference signal received power value associated with the control signaling. The operations of 1215 may be performed in accordance with examples as disclosed herein. In some examples, aspects of the operations of 1215 may be performed by a quality analysis component 1035 as described with reference to FIG. 10.

At 1220, the method may include selecting a resource availability probability value associated with the sidelink resource based on attempting to decode the control signaling, the log likelihood ratio quality, and the reference signal received power value. The operations of 1220 may be performed in accordance with examples as disclosed herein. In some examples, aspects of the operations of 1220 may be performed by a resource availability probability component 1040 as described with reference to FIG. 10.

At 1225, the method may include transmitting a sidelink message based on the resource availability probability value. The operations of 1225 may be performed in accordance with examples as disclosed herein. In some examples, aspects of the operations of 1225 may be performed by a transmission component 1045 as described with reference to FIG. 10.

Figure 13:
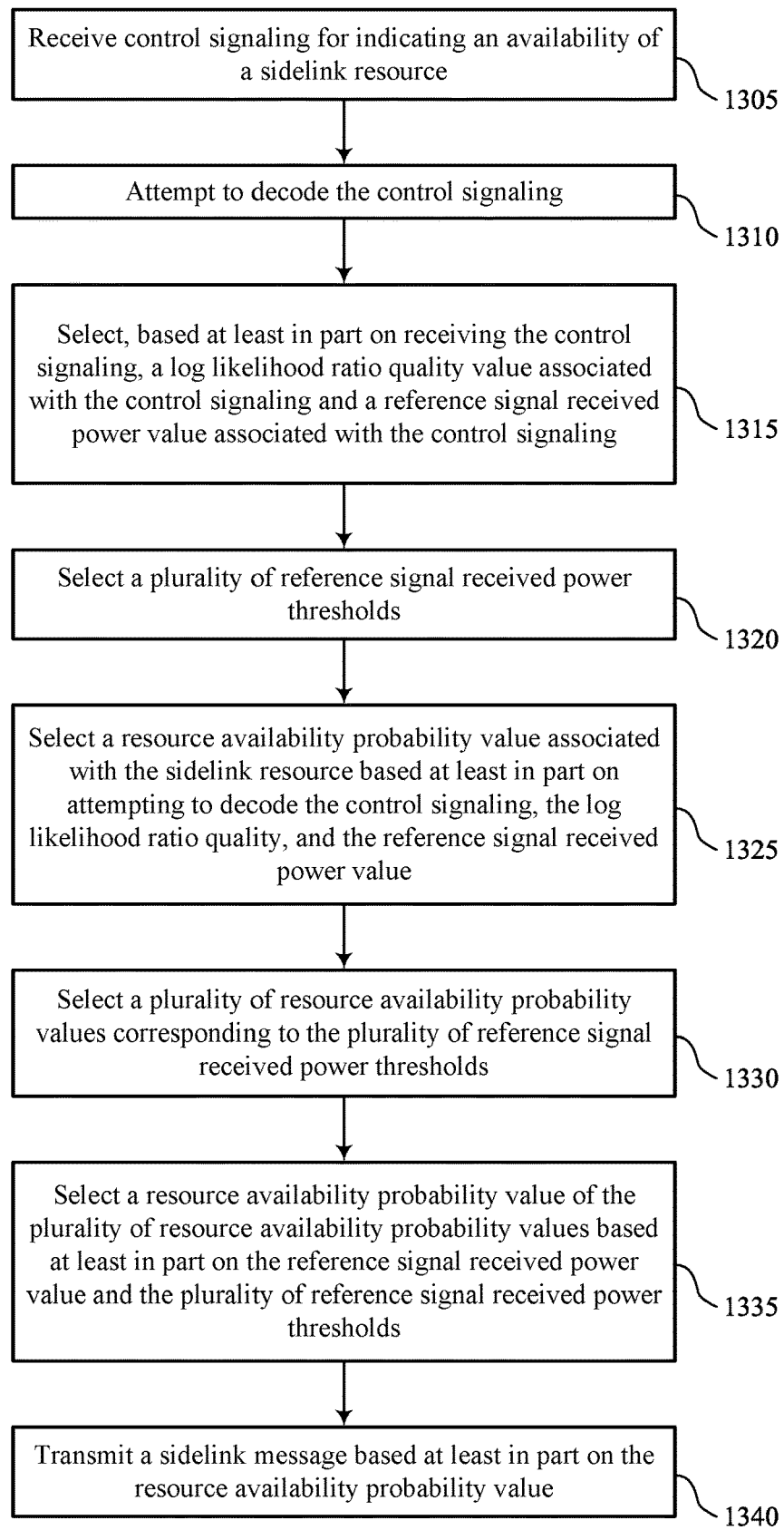

FIG. 13 shows a flowchart illustrating a method 1300 that supports soft methods for resource selection based on sidelink control information in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include receiving control signaling for indicating an availability of a sidelink resource. The operations of 1305 may be performed in accordance with examples as disclosed herein. In some examples, aspects of the operations of 1305 may be performed by a control signaling component 1025 as described with reference to FIG. 10.

At 1310, the method may include attempting to decode the control signaling. The operations of 1310 may be performed in accordance with examples as disclosed herein. In some examples, aspects of the operations of 1310 may be performed by a control signaling decoding component 1030 as described with reference to FIG. 10.

At 1315, the method may include selecting, based on receiving the control signaling, a log likelihood ratio quality value associated with the control signaling and a reference signal received power value associated with the control signaling. The operations of 1315 may be performed in accordance with examples as disclosed herein. In some examples, aspects of the operations of 1315 may be performed by a quality analysis component 1035 as described with reference to FIG. 10.

At 1320, the method may include selecting a set of multiple reference signal received power thresholds. The operations of 1320 may be performed in accordance with examples as disclosed herein. In some examples, aspects of the operations of 1320 may be performed by a reference signal received power threshold component 1050 as described with reference to FIG. 10.

At 1325, the method may include selecting a resource availability probability value associated with the sidelink resource based on attempting to decode the control signaling, the log likelihood ratio quality, and the reference signal received power value. The operations of 1325 may be performed in accordance with examples as disclosed herein. In some examples, aspects of the operations of 1325 may be performed by a resource availability probability component 1040 as described with reference to FIG. 10.

At 1330, the method may include selecting a set of multiple resource availability probability values corresponding to the set of multiple reference signal received power thresholds. The operations of 1330 may be performed in accordance with examples as disclosed herein. In some examples, aspects of the operations of 1330 may be performed by a resource availability probability component 1040 as described with reference to FIG. 10.

At 1335, the method may include selecting a resource availability probability value of the set of multiple resource availability probability values based on the reference signal received power value and the set of multiple reference signal received power thresholds. The operations of 1335 may be performed in accordance with examples as disclosed herein. In some examples, aspects of the operations of 1335 may be performed by a resource availability probability component 1040 as described with reference to FIG. 10.

At 1340, the method may include transmitting a sidelink message based on the resource availability probability value. The operations of 1340 may be performed in accordance with examples as disclosed herein. In some examples, aspects of the operations of 1340 may be performed by a transmission component 1045 as described with reference to FIG. 10.

Figure 14:
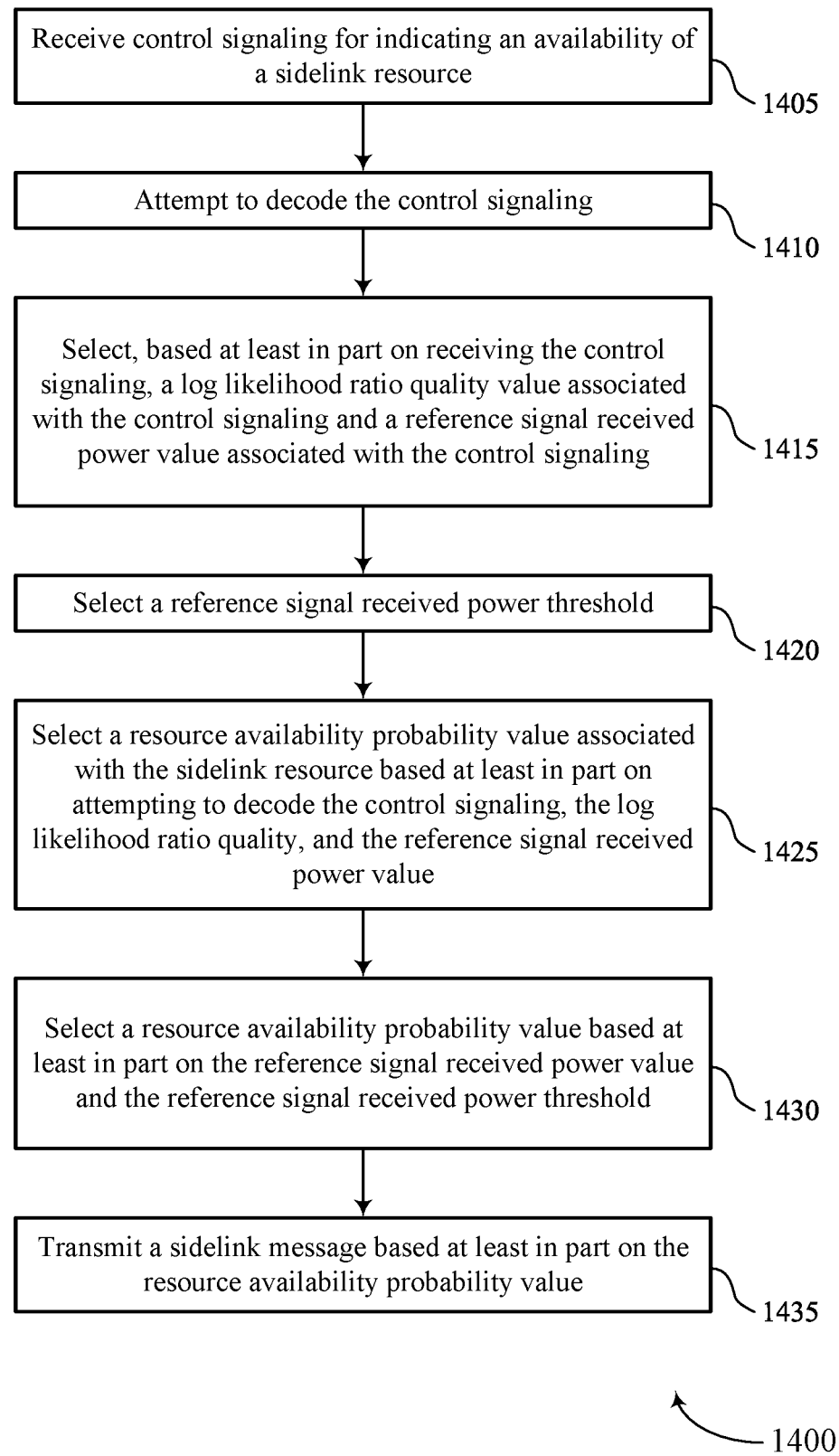

FIG. 14 shows a flowchart illustrating a method 1400 that supports soft methods for resource selection based on sidelink control information in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include receiving control signaling for indicating an availability of a sidelink resource. The operations of 1405 may be performed in accordance with examples as disclosed herein. In some examples, aspects of the operations of 1405 may be performed by a control signaling component 1025 as described with reference to FIG. 10.

At 1410, the method may include attempting to decode the control signaling. The operations of 1410 may be performed in accordance with examples as disclosed herein. In some examples, aspects of the operations of 1410 may be performed by a control signaling decoding component 1030 as described with reference to FIG. 10.

At 1415, the method may include selecting, based on receiving the control signaling, a log likelihood ratio quality value associated with the control signaling and a reference signal received power value associated with the control signaling. The operations of 1415 may be performed in accordance with examples as disclosed herein. In some examples, aspects of the operations of 1415 may be performed by a quality analysis component 1035 as described with reference to FIG. 10.

At 1420, the method may include selecting a reference signal received power threshold. The operations of 1420 may be performed in accordance with examples as disclosed herein. In some examples, aspects of the operations of 1420 may be performed by a reference signal received power threshold component 1050 as described with reference to FIG. 10.

At 1425, the method may include selecting a resource availability probability value associated with the sidelink resource based on attempting to decode the control signaling, the log likelihood ratio quality, and the reference signal received power value. The operations of 1425 may be performed in accordance with examples as disclosed herein. In some examples, aspects of the operations of 1425 may be performed by a resource availability probability component 1040 as described with reference to FIG. 10.

At 1430, the method may include selecting a resource availability probability value based on the reference signal received power value and the reference signal received power threshold. The operations of 1430 may be performed in accordance with examples as disclosed herein. In some examples, aspects of the operations of 1430 may be performed by a resource availability probability component 1040 as described with reference to FIG. 10.

At 1435, the method may include transmitting a sidelink message based on the resource availability probability value. The operations of 1435 may be performed in accordance with examples as disclosed herein. In some examples, aspects of the operations of 1435 may be performed by a transmission component 1045 as described with reference to FIG. 10.

Figure 15:
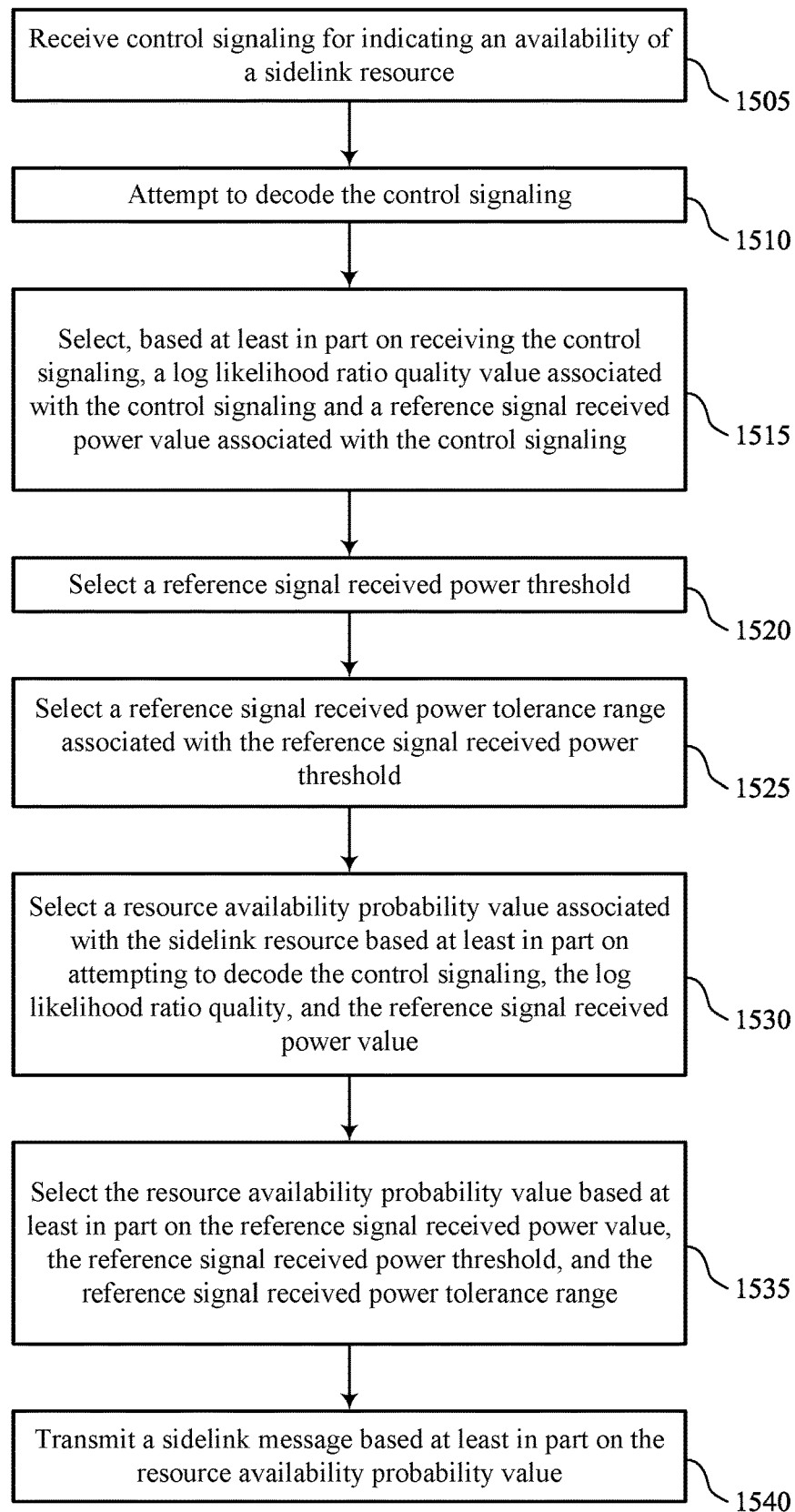

FIG. 15 shows a flowchart illustrating a method 1500 that supports soft methods for resource selection based on sidelink control information in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include receiving control signaling for indicating an availability of a sidelink resource. The operations of 1505 may be performed in accordance with examples as disclosed herein. In some examples, aspects of the operations of 1505 may be performed by a control signaling component 1025 as described with reference to FIG. 10.

At 1510, the method may include attempting to decode the control signaling. The operations of 1510 may be performed in accordance with examples as disclosed herein. In some examples, aspects of the operations of 1510 may be performed by a control signaling decoding component 1030 as described with reference to FIG. 10.

At 1515, the method may include selecting, based on receiving the control signaling, a log likelihood ratio quality value associated with the control signaling and a reference signal received power value associated with the control signaling. The operations of 1515 may be performed in accordance with examples as disclosed herein. In some examples, aspects of the operations of 1515 may be performed by a quality analysis component 1035 as described with reference to FIG. 10.

At 1520, the method may include selecting a reference signal received power threshold. The operations of 1520 may be performed in accordance with examples as disclosed herein. In some examples, aspects of the operations of 1520 may be performed by a reference signal received power threshold component 1050 as described with reference to FIG. 10.

At 1525, the method may include selecting a reference signal received power tolerance range associated with the reference signal received power threshold. The operations of 1525 may be performed in accordance with examples as disclosed herein. In some examples, aspects of the operations of 1525 may be performed by a reference signal received power threshold component 1050 as described with reference to FIG. 10.

At 1530, the method may include selecting a resource availability probability value associated with the sidelink resource based on attempting to decode the control signaling, the log likelihood ratio quality, and the reference signal received power value. The operations of 1530 may be performed in accordance with examples as disclosed herein. In some examples, aspects of the operations of 1530 may be performed by a resource availability probability component 1040 as described with reference to FIG. 10.

At 1535, the method may include selecting the resource availability probability value based on the reference signal received power value, the reference signal received power threshold, and the reference signal received power tolerance range. The operations of 1535 may be performed in accordance with examples as disclosed herein. In some examples, aspects of the operations of 1535 may be performed by a resource availability probability component 1040 as described with reference to FIG. 10.

At 1540, the method may include transmitting a sidelink message based on the resource availability probability value. The operations of 1540 may be performed in accordance with examples as disclosed herein. In some examples, aspects of the operations of 1540 may be performed by a transmission component 1045 as described with reference to FIG. 10.

The following provides an overview of aspects of the present disclosure:

Aspect 1: A method for wireless communications at a UE, comprising: receiving control signaling for indicating an availability of a sidelink resource; attempting to decode the control signaling; selecting, based at least in part on receiving the control signaling, a log likelihood ratio quality value associated with the control signaling and a reference signal received power value associated with the control signaling; selecting a resource availability probability value associated with the sidelink resource based at least in part on attempting to decode the control signaling, the log likelihood ratio quality value, and the reference signal received power value; and transmitting a sidelink message based at least in part on the resource availability probability value.

Aspect 2: The method of aspect 1, wherein selecting the resource availability probability value comprises: selecting a plurality of reference signal received power thresholds; selecting a plurality of resource availability probability values corresponding to the plurality of reference signal received power thresholds; and selecting a resource availability probability value of the plurality of resource availability probability values based at least in part on the reference signal received power value and the plurality of reference signal received power thresholds.

Aspect 3: The method of any of aspects 1 through 2, wherein selecting the resource availability probability value comprises: selecting a reference signal received power threshold; and selecting a resource availability probability value based at least in part on the reference signal received power value and the reference signal received power threshold.

Aspect 4: The method of aspect 3, further comprising: selecting the resource availability probability value is based at least in part on a difference between the reference signal received power value and the reference signal received power threshold.

Aspect 5: The method of any of aspects 3 through 4, further comprising: adjusting the reference signal received power threshold based at least in part on an availability of sidelink resources.

Aspect 6: The method of any of aspects 1 through 5, wherein selecting the resource availability probability value comprises: selecting a reference signal received power threshold; selecting a reference signal received power tolerance range associated with the reference signal received power threshold; and selecting the resource availability probability value based at least in part on the reference signal received power value, the reference signal received power threshold, and the reference signal received power tolerance range.

Aspect 7: The method of aspect 6, wherein selecting a resource availability probability value is based at least in part on whether the reference signal received power value is within the reference signal received power tolerance range.

Aspect 8: The method of any of aspects 1 through 7, wherein selecting the resource availability probability value comprises: obtaining an absolute value of an input or output vector of the log likelihood ratio quality value; and selecting the resource availability probability value based at least in part on the absolute value.

Aspect 9: The method of any of aspects 1 through 8, wherein selecting the resource availability probability value comprises: obtaining a signal to noise ratio or a block error rate based at least in part on the log likelihood ratio quality value; and selecting the resource availability probability value based at least in part on the signal to noise ratio or the block error rate.

Aspect 10: The method of any of aspects 1 through 9, further comprising: selecting a resource availability probability is based at least in part on successfully decoding the control signaling.

Aspect 11: The method of any of aspects 1 through 10, further comprising: selecting a resource availability probability is based at least in part on unsuccessfully decoding the control signaling.

Aspect 12: The method of any of aspects 1 through 11, wherein transmitting the sidelink message comprises: determining whether to transmit the sidelink message on the sidelink resource based at least in part on the resource availability probability value.

Aspect 13: The method of any of aspects 1 through 12, further comprising: receiving control signaling indicating one or more reference signal received power thresholds and one or more resource availability probability values.

Aspect 14: An apparatus for wireless communications at a UE, comprising a processor; memory coupled with the processor; and instructions stored in the memory and executable by the processor to cause the apparatus to perform a method of any of aspects 1 through 13.

Aspect 15: An apparatus for wireless communications at a UE, comprising at least one means for performing a method of any of aspects 1 through 13.

Aspect 16: A non-transitory computer-readable medium storing code for wireless communications at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling for indicating an availability of a sidelink resource;
   attempting to decode the control signaling;
   selecting, based at least in part on receiving the control signaling, a log likelihood ratio quality value associated with the control signaling and a reference signal received power value associated with the control signaling;
   selecting a resource availability probability value that expresses a probability that the sidelink resource is accessible by the UE for communication, the selecting based at least in part on attempting to decode the control signaling, the log likelihood ratio quality value, and the reference signal received power value; and
   transmitting a sidelink message based at least in part on the resource availability probability value.

2. The method of claim 1, wherein selecting the resource availability probability value comprises:
   selecting a plurality of reference signal received power thresholds;
   selecting a plurality of resource availability probability values corresponding to the plurality of reference signal received power thresholds; and
   selecting a resource availability probability value of the plurality of resource availability probability values based at least in part on the reference signal received power value and the plurality of reference signal received power thresholds.

3. The method of claim 1, wherein selecting the resource availability probability value comprises:
   selecting a reference signal received power threshold; and
   selecting a resource availability probability value based at least in part on the reference signal received power value and the reference signal received power threshold.

4. The method of claim 3, further comprising:
   selecting the resource availability probability value is based at least in part on a difference between the reference signal received power value and the reference signal received power threshold.

5. The method of claim 3, further comprising:
   adjusting the reference signal received power threshold based at least in part on an availability of sidelink resources.

6. The method of claim 1, wherein selecting the resource availability probability value comprises:
   selecting a reference signal received power threshold;
   selecting a reference signal received power tolerance range associated with the reference signal received power threshold; and
   selecting the resource availability probability value based at least in part on the reference signal received power value, the reference signal received power threshold, and the reference signal received power tolerance range.

7. The method of claim 6, wherein selecting the resource availability probability value is based at least in part on whether the reference signal received power value is within the reference signal received power tolerance range.

8. The method of claim 1, wherein selecting the resource availability probability value comprises:
   obtaining an absolute value of an input or output vector of the log likelihood ratio quality value; and
   selecting the resource availability probability value based at least in part on the absolute value.

9. The method of claim 1, wherein selecting the resource availability probability value comprises:
   obtaining a signal to noise ratio or a block error rate based at least in part on the log likelihood ratio quality value; and
   selecting the resource availability probability value based at least in part on the signal to noise ratio or the block error rate.

10. The method of claim 1, wherein:
    selecting the resource availability probability value is based at least in part on successfully decoding the control signaling.

11. The method of claim 1, wherein:
    selecting the resource availability probability value is based at least in part on unsuccessfully decoding the control signaling.

12. The method of claim 1, wherein transmitting the sidelink message comprises:
    determining whether to transmit the sidelink message on the sidelink resource based at least in part on the resource availability probability value.

13. The method of claim 1, further comprising:
    receiving control signaling indicating one or more reference signal received power thresholds and one or more resource availability probability values.

14. An apparatus for wireless communications at a user equipment (UE), comprising:
    a processor;
    memory coupled with the processor; and
    instructions stored in the memory and executable by the processor to cause the apparatus to:
       receive control signaling for indicating an availability of a sidelink resource;
       attempt to decode the control signaling;
       select, based at least in part on receiving the control signaling, a log likelihood ratio quality value associated with the control signaling and a reference signal received power value associated with the control signaling;
       select a resource availability probability value that expresses a probability that the sidelink resource is accessible by the UE for communication, the selecting based at least in part on attempting to decode the control signaling, the log likelihood ratio quality value, and the reference signal received power value; and
       transmit a sidelink message based at least in part on the resource availability probability value.

15. The apparatus of claim 14, wherein the instructions to select the resource availability probability value are executable by the processor to cause the apparatus to:
    select a plurality of reference signal received power thresholds;
    select a plurality of resource availability probability values corresponding to the plurality of reference signal received power thresholds; and select a resource availability probability value of the plurality of resource availability probability values based at least in part on the reference signal received power value and the plurality of reference signal received power thresholds.

16. The apparatus of claim 14, wherein the instructions to select the resource availability probability value are executable by the processor to cause the apparatus to:
   select a reference signal received power threshold; and
   select a resource availability probability value based at least in part on the reference signal received power value and the reference signal received power threshold.

17. The apparatus of claim 16, wherein the instructions are further executable by the processor to cause the apparatus to:
   select the resource availability probability value based at least in part on a difference between the reference signal received power value and the reference signal received power threshold.

18. The apparatus of claim 16, wherein the instructions are further executable by the processor to cause the apparatus to:
   adjust the reference signal received power threshold based at least in part on an availability of sidelink resources.

19. The apparatus of claim 14, wherein the instructions to select the resource availability probability value are executable by the processor to cause the apparatus to:
   select a reference signal received power threshold;
   select a reference signal received power tolerance range associated with the reference signal received power threshold; and
   select the resource availability probability value based at least in part on the reference signal received power value, the reference signal received power threshold, and the reference signal received power tolerance range.

20. The apparatus of claim 19, wherein selecting a resource availability probability value is based at least in part on whether the reference signal received power value is within the reference signal received power tolerance range.

21. The apparatus of claim 14, wherein the instructions to select the resource availability probability value are executable by the processor to cause the apparatus to:
   obtain an absolute value of an input or output vector of the log likelihood ratio quality value; and
   select the resource availability probability value based at least in part on the absolute value.

22. The apparatus of claim 14, wherein the instructions to select the resource availability probability value are executable by the processor to cause the apparatus to:
   obtain a signal to noise ratio or a block error rate based at least in part on the log likelihood ratio quality value; and
   select the resource availability probability value based at least in part on the signal to noise ratio or the block error rate.

23. The apparatus of claim 14, wherein the instructions are further executable by the processor to cause the apparatus to:
   select the resource availability probability value based at least in part on successfully decoding the control signaling.

24. The apparatus of claim 14, wherein the instructions are further executable by the processor to cause the apparatus to:
   select the resource availability probability value is based at least in part on unsuccessfully decoding the control signaling.

25. The apparatus of claim 14, wherein the instructions to transmit the sidelink message are executable by the processor to cause the apparatus to:
   determine whether to transmit the sidelink message on the sidelink resource based at least in part on the resource availability probability value.

26. The apparatus of claim 14, wherein the instructions are further executable by the processor to cause the apparatus to:
   receive control signaling indicating one or more reference signal received power thresholds and one or more resource availability probability values.

27. A non-transitory computer-readable medium storing code for wireless communications at a user equipment (UE), the code comprising instructions executable by a processor to:
   receive control signaling for indicating an availability of a sidelink resource;
   attempt to decode the control signaling;
   select, based at least in part on receiving the control signaling, a log likelihood ratio quality value associated with the control signaling and a reference signal received power value associated with the control signaling;
   select a resource availability probability value that expresses a probability that the sidelink resource is accessible by the UE for communication, the selecting based at least in part on attempting to decode the control signaling, the log likelihood ratio quality value, and the reference signal received power value; and
   transmit a sidelink message based at least in part on the resource availability probability value.

28. The non-transitory computer-readable medium of claim 27, wherein the instructions to select the resource availability probability value are executable by the processor to:
   select a reference signal received power threshold; and
   select a resource availability probability value based at least in part on the reference signal received power value and the reference signal received power threshold.

* * * * *